(12) United States Patent
Swami et al.

(10) Patent No.: US 12,260,511 B2
(45) Date of Patent: Mar. 25, 2025

(54) FRONT-END SCALER CIRCUIT FOR PROCESSING DEMOSAICED IMAGE DATA

(71) Applicant: Apple Inc., Cupertino, CA (US)

(72) Inventors: Sarvesh Swami, San Jose, CA (US); David R Pope, Campbell, CA (US); Sheng Lin, San Jose, CA (US)

(73) Assignee: APPLE INC., Cupertino, CA (US)

( * ) Notice: Subject to any disclaimer, the term of this patent is extended or adjusted under 35 U.S.C. 154(b) by 471 days.

(21) Appl. No.: 17/578,195

(22) Filed: Jan. 18, 2022

(65) Prior Publication Data
US 2023/0230200 A1 Jul. 20, 2023

(51) Int. Cl.
*G06T 3/4015* (2024.01)
*G06T 5/50* (2006.01)
*G06T 5/70* (2024.01)

(52) U.S. Cl.
CPC ............. *G06T 3/4015* (2013.01); *G06T 5/50* (2013.01); *G06T 5/70* (2024.01); *G06T 2207/20212* (2013.01)

(58) Field of Classification Search
CPC ... G06T 5/70; G06T 2207/10024; G06T 5/92; G06T 1/60; G06T 9/00; G06T 2207/10004; G06T 3/40; G06T 1/00; G06T 1/0007; G06T 7/90; G06T 3/4015; G06T 5/50; G06T 2207/20212; H04N 23/843; H04N 2101/00; H04N 25/134; H04N 19/117; H04N 23/80; H04N 25/6153; H04N 9/77; H04N 2209/045
See application file for complete search history.

(56) References Cited

U.S. PATENT DOCUMENTS

| | | | |
|---|---|---|---|
| 8,254,718 B2* | 8/2012 | Bennett | G06T 5/20 382/167 |
| 8,957,999 B2 | 2/2015 | Sun | |
| 9,135,681 B2* | 9/2015 | Tomaselli | G06T 5/70 |
| 9,860,429 B1 | 1/2018 | Silverstein et al. | |
| 9,911,177 B2 | 3/2018 | Lim et al. | |
| 11,012,603 B2 | 5/2021 | Suman et al. | |
| 2005/0135700 A1* | 6/2005 | Anderson | G06T 5/70 382/261 |
| 2008/0030603 A1* | 2/2008 | Masuno | H04N 23/11 348/E9.01 |

(Continued)

*Primary Examiner* — Aaron W Carter
*Assistant Examiner* — Courtney Joan Nelson
(74) *Attorney, Agent, or Firm* — Sterne, Kessler, Goldstein & Fox P.L.L.C.

(57) ABSTRACT

Embodiments relate to a front-end scaler circuit configured to receive and process demosaiced image data in different modes depending on if the demosaiced image data was demosaiced from Bayer or Quad Bayer raw image data. The front-end scaler circuit shares memory with a demosaicing circuit, and is configured to perform different operations that use different amounts of the shared memory based on the original image format of the demosaiced image data being processed, to compensate for additional memory utilized by the demosaicing circuit when demosaicing certain types of image data. For example, when processing image data demosaiced from Quad Bayer image data, the front-end scaler circuit discards a portion of the chrominance component data for the received image data before performing chromatic suppression, compared to when processing image data demosaiced from Bayer image data.

20 Claims, 13 Drawing Sheets

(56) References Cited

U.S. PATENT DOCUMENTS

2017/0061576 A1* 3/2017 Lim .................... G06T 3/40
2018/0367775 A1* 12/2018 Buettner ............... H04N 9/78
2019/0318451 A1* 10/2019 Swami ................ G06T 3/4015

* cited by examiner

FRONT-END SCALER CIRCUIT FOR PROCESSING DEMOSAICED IMAGE DATA

BACKGROUND

1. Field of the Disclosure

The present disclosure relates to a circuit for processing images and more specifically to processing of demosaiced image data.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Image sensors typically capture image data using a color filter array, resulting in the raw image data where each pixel is associated with a particular color channel. Image processing pipelines may include circuitry for demosaicing raw image data to generate full-color image data, where different circuits may be used for different raw image formats. In addition, different image processing operations may be performed on the demosaiced image data, based on the original raw image format that the demosaiced image data was demosaiced from.

SUMMARY

Embodiments relate to a circuit for processing image data. The circuit comprises a first demosaicing circuit configured to receive first image data in a first raw image format, and to demosaic the first image data to generate first demosaiced image data, as well as a second demosaicing circuit configured to receive second image data in a second raw image format, and to demosaic the second image data to generate second demosaiced image data. The second demosaicing circuit demosaics the second image data by interpolating a green channel of the second image data along one or more directions to yield an interpolated green channel, generating a gradient of the second image data, modifying the interpolated green channel based on the gradient to generate full-resolution green channel image data, and combining the full-resolution green channel image data with red and blue channel image data to generate the second demosaiced image data. The circuit further comprises a logic circuit configured to receive the first image data and the second image data from an image sensor, and to provide the first image data to the first demosaicing circuit, and the second image data to the second demosaicing circuit. In some embodiments, the first raw image format is a Bayer raw image format, and the second raw image format is a Quad Bayer raw image format. In some embodiments, the first demosaiced image data and the second demosaiced image data are both RGB image data. In some embodiments, the first demosaicing circuit and the second demosaicing circuit utilized a shared set of line buffers for generating the first demosaiced image data from the first image data and the second demosaiced image from the second image data, respectively. In some embodiments, the circuit further shares a second shared set of line buffers with a scaler circuit configured to perform post-processing on the first and second demosaiced image data.

Figure 1:
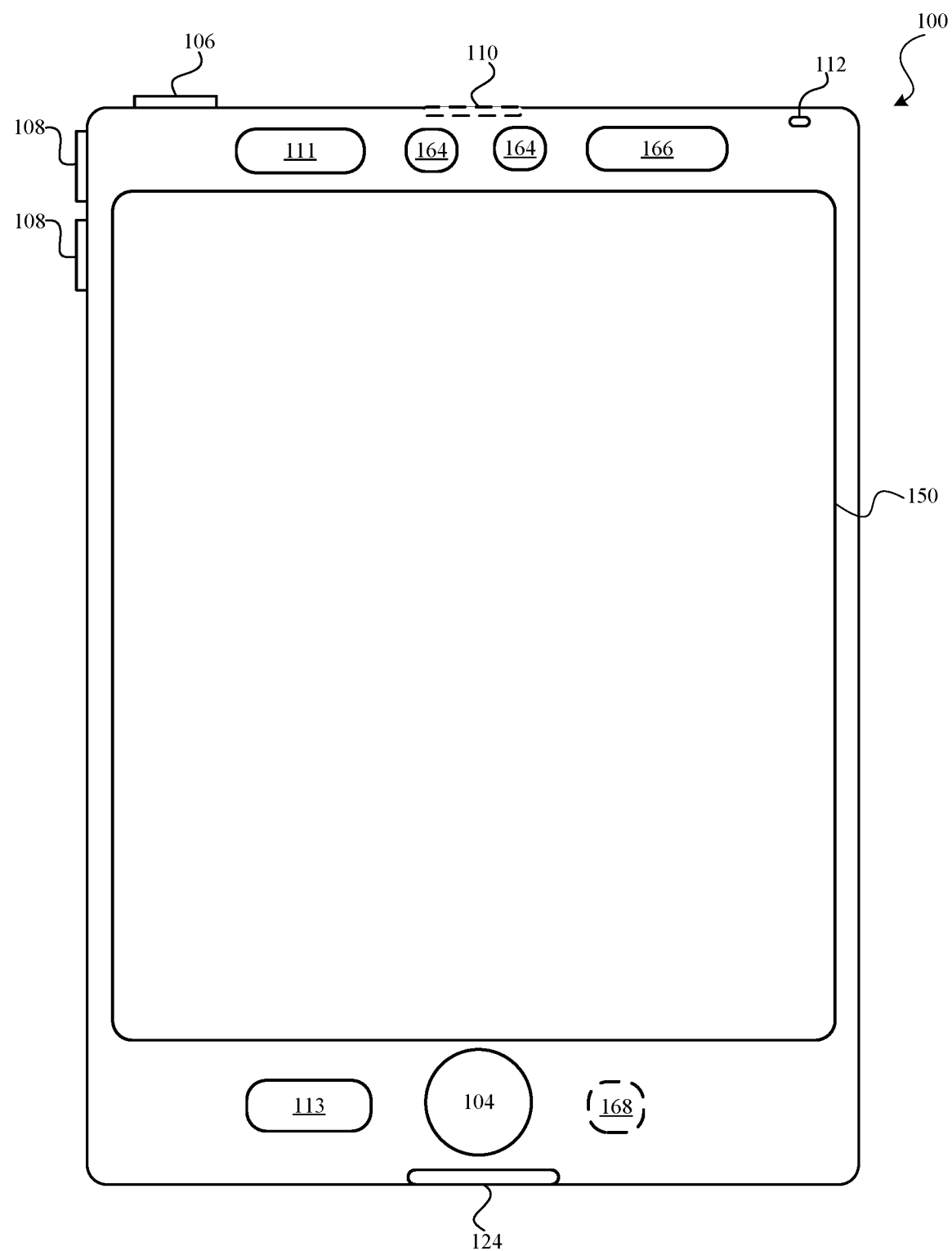
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a multi-mode demosaicing circuit able to receive and demosaic image data in a different raw image formats (e.g., a first raw image format corresponding to Bayer image data, and a second raw image format corresponding to Quad Bayer image data). The multi-mode demosaicing circuit comprises different circuitry for demosaicing different image formats that access a shared working memory. In addition, the multi-mode demosaicing circuit shares memory with a post-processing and scaling circuit configured to perform subsequent post-processing and/or scaling of the demosaiced image data, in which the operations of the post-processing and scaling circuit are modified based on the original raw image format of the demosaiced image data to use different amounts of the shared memory, to compensate for additional memory utilized by the multi-mode demosaicing circuit when demosaicing certain types of image data (e.g., Quad Bayer image data). As such, the ability to demosaic raw image data of either the first or second raw image format is implemented without increasing an amount of memory needed on the chip relative to an amount of memory needed for performing demosaicing and subsequent processing for only image data of the first raw image format.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 110, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 110, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
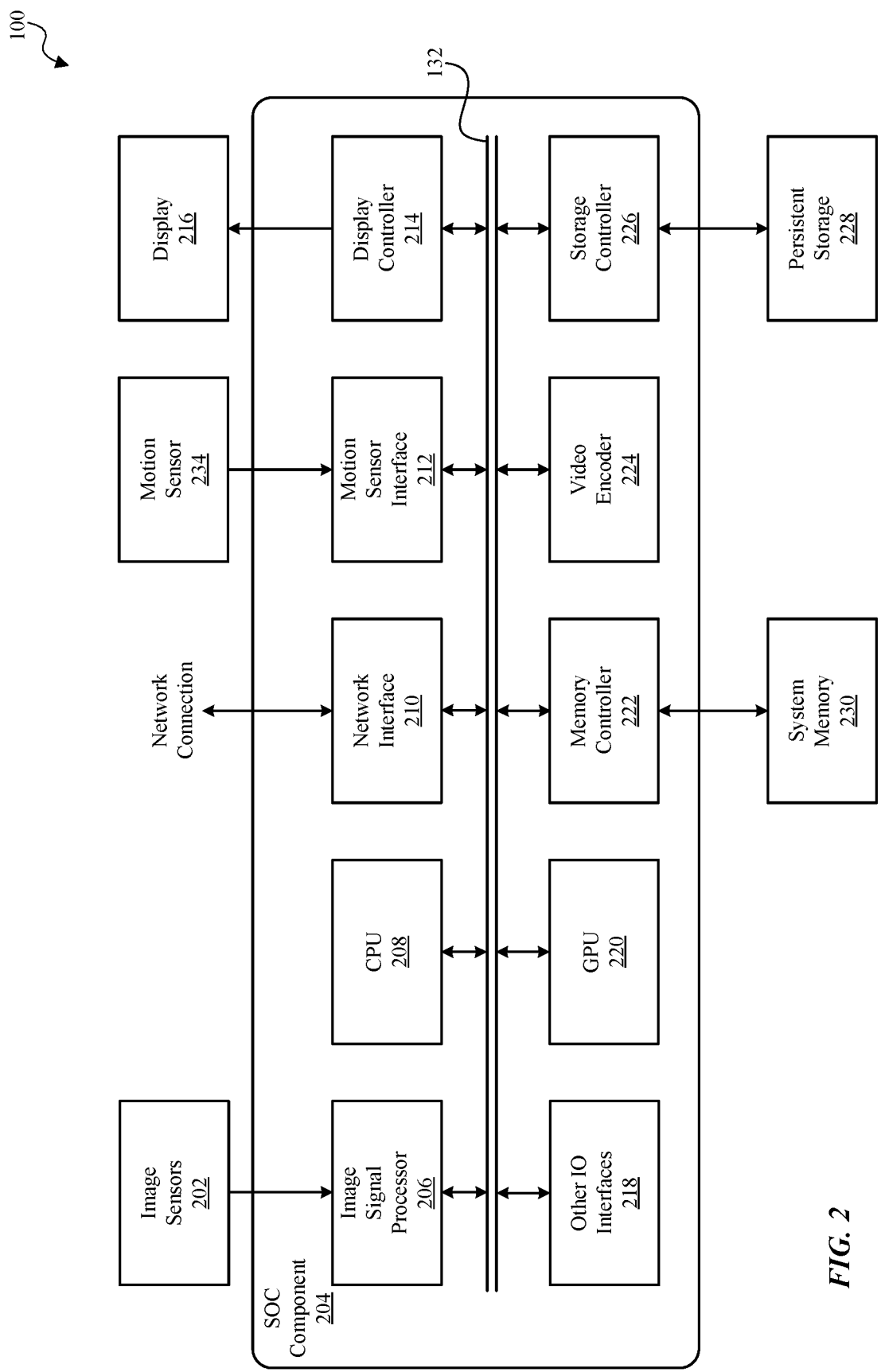
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
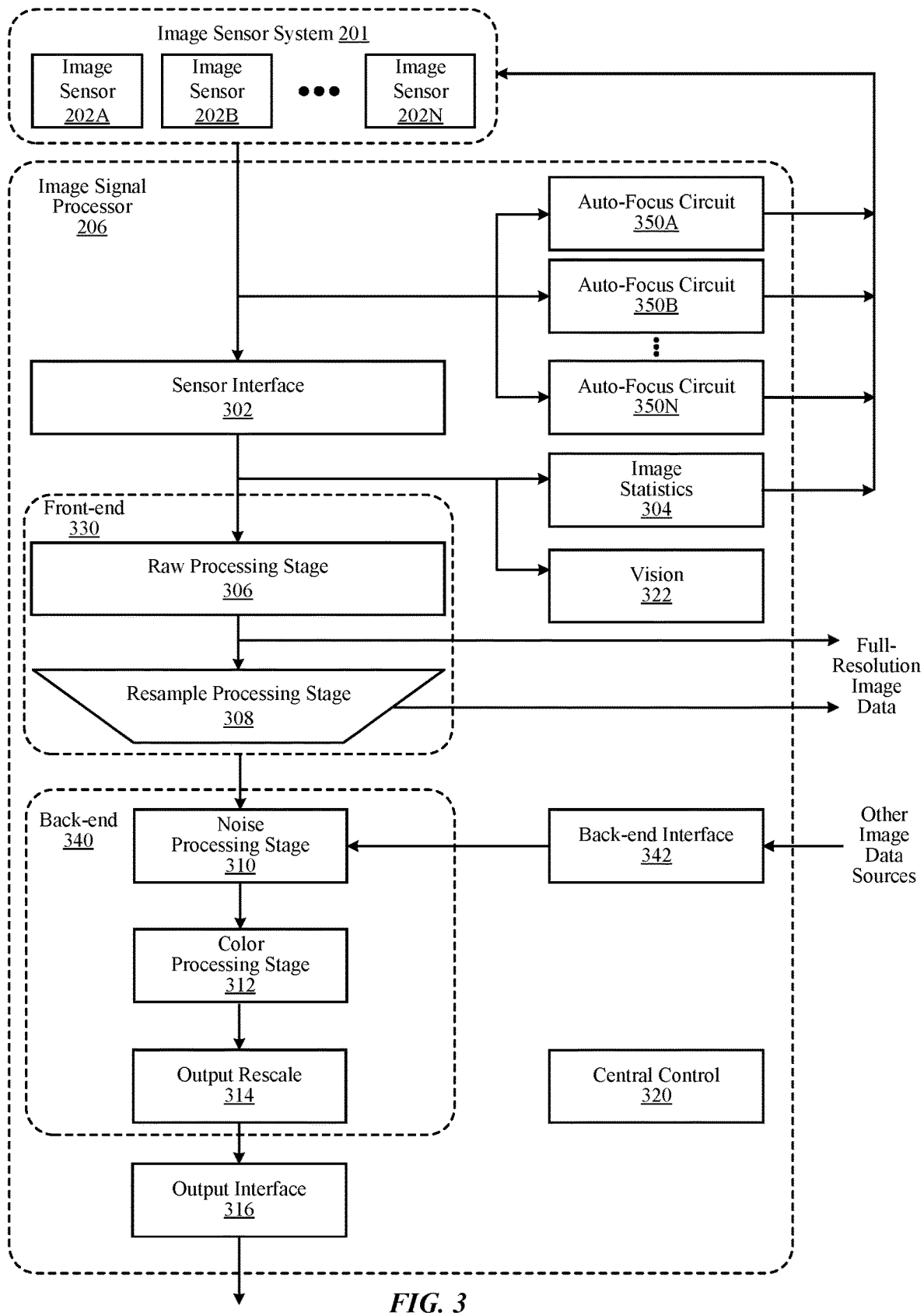
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface module 302, central control module 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include a hardware circuit that analyzes raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to a sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a drop-off in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCbCr format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of an image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional input coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via the output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Multi-mode Demosaicing

Figure 4:
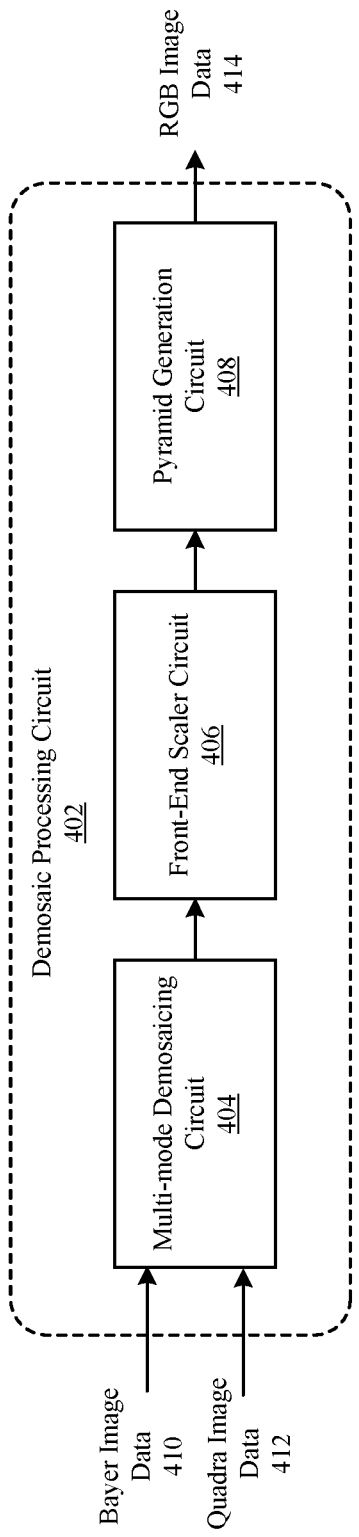
FIG. 4 is a block diagram illustrating a demosaic processing circuit, according to one embodiment.

FIG. 4 is a block diagram illustrating a demosaic processing circuit, according to one embodiment. In some embodiments, the demosaic processing circuit 402 is implemented as part of the resample processing stage 308 illustrated in FIG. 3.

The demosaic processing circuit 402 includes a multi-mode demosaicing circuit 404, a front-end scaler circuit 406, and a pyramid generation circuit 408. The multi-mode demosaicing circuit 404 is configured to receive raw image data from the image sensor 202, and to demosaic the received image data to output full-color image data. For example, as discussed above, demosaicing may include operations for converting and/or interpolating missing color samples from the raw image data (e.g., Bayer image data) to output image data into a full-color domain (e.g., RGB image data), and may include low pass directional filtering on interpolated samples to obtain full-color pixels.

The multi-mode demosaicing circuit 404 is configured to receive raw image data in a plurality of different image formats. For example, in some embodiments, the image sensor 202 may be configured to operate in a first mode to capture raw image data in a first format, and a second mode to capture raw image data in a second format. In some embodiments, the first format may correspond to Bayer image data 410, while the second format corresponds to Quad Bayer image data 412 (hereinafter also referred to as "Quadra image data"). In some embodiments, the multi-mode demosaicing circuit 404 receives image data in different raw image formats (e.g., Bayer image data 410 and Quadra image data 412) from different image sensors 202.

Figure 5A:
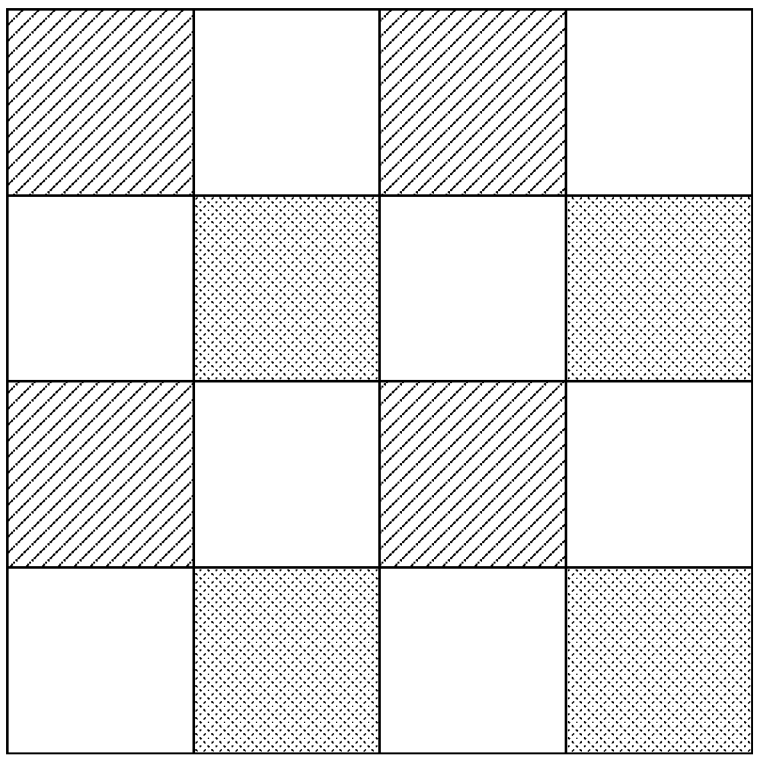
FIGS. 5A and 5B illustrate examples of raw image data in the Bayer image format and Quadra image format, in accordance with some embodiments.
Figure 5A:
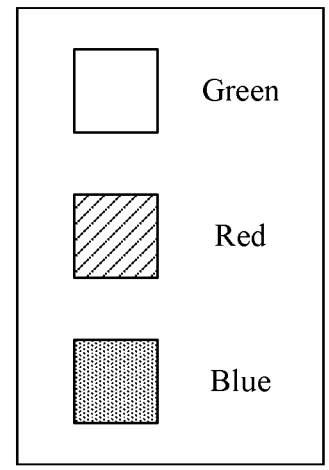
Figure 5B:
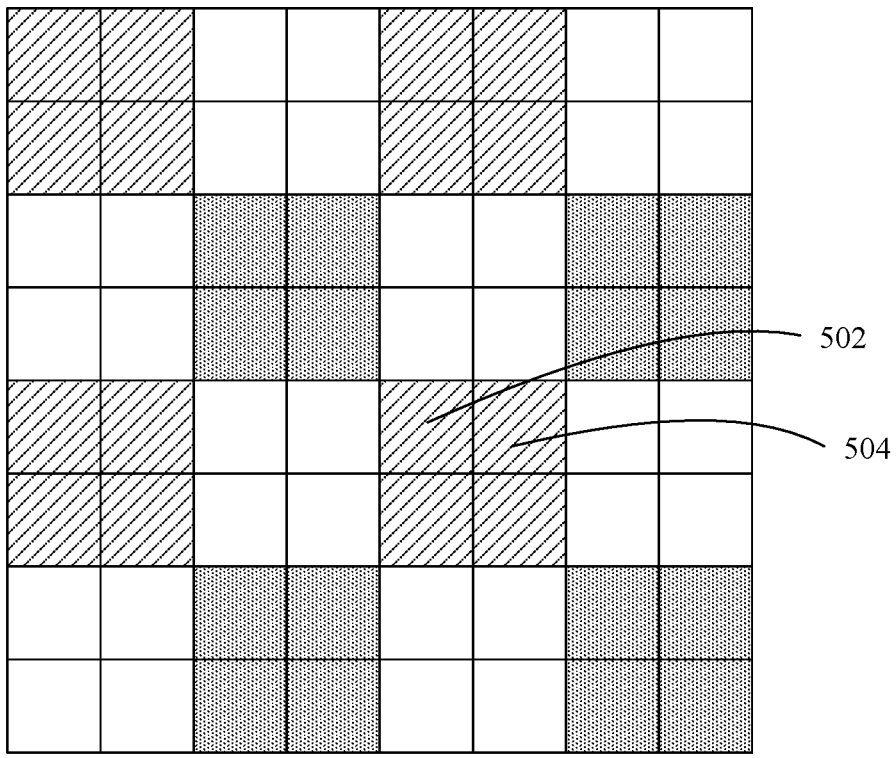

FIGS. 5A and 5B illustrate examples of raw image data in the Bayer image format and Quadra image format, in accordance with some embodiments. Each pixel in the raw image data corresponds to a particular color component: red (R), blue (B), or green (G). As illustrated in FIG. 5A, in Bayer raw image data, each row of Bayer image data contains alternating green pixels and non-green pixels, where the non-green pixels the rows alternate between red and blue. On the other hand, as illustrated in FIG. 5B, in Quadra raw image data, the captured pixels are grouped into 2×2 blocks, with each 2×2 block of pixels being of the same color.

In some embodiments, the image sensor 202 may be a 48 megapixel sensor configured to capture Quadra image data when zoomed in, and Bayer image data when zoomed out. For example, when zoomed in, a center region of pixels of the image sensor is used to capture image data as Quadra image data. However, when zoomed out, blocks of 2×2 pixels may be combined to form one pixel of Bayer image data, resulting in a wider view captured with larger, lower-resolution pixels. In some embodiments, the image sensor 202 may switch between Quadra and Bayer image modes depending upon an amount of luminance in a scene, and/or other factors.

The front-end scaler circuit 406 is configured to receive the full-color image data generated by the multi-mode demosaicing circuit 404 and perform additional post-processing operations on the received image data, such as removal of color aliasing artifacts near luminance edges, dot-removal to remove dot-artifacts produced by the demosaicing circuit, etc. In addition, the front-end scaler circuit 406 may scale the received image data based on the requirements of the subsequent operations to be performed on the image. In some embodiments, downscaling is performed to reduce an amount of computation required in the back-end of the pipeline, while upscaling may be performed to improve fusion quality when the raw pyramid is used in temporal filtering.

For example, in some embodiments the scaling circuit 406 may operate in a first non-scaling mode in which the front-end scaler circuit 406 performs chroma aliasing artifact suppression and/or dot-removal operations, but does not perform any scaling, or a scaling mode in which downsampling or upscaling is performed following chroma suppression and/or dot-removal operations. In some embodiments, scaling is performed by converting received full-color image data to YCC image data and from 4:4:4 format to 4:2:2 format by smoothing and downsampling the chrominance to save line buffer space, followed by vertical resampling and horizontal resampling based on the desired scale to produce an output image. As such, in some embodiments, the non-scaling mode may also be referred to as 4:4:4 mode, while the scaling mode is referred to as 4:2:2 mode.

The pyramid generation circuit 408 is configured to generate a pyramid containing multiple octaves representing multiple scales of an input image. In some embodiments, the pyramid generation circuit 408 receives full-color image data generated by the front-end scaler circuit 406, and generates at least two octaves corresponding to at least a full-resolution luminance image (Scale 0) and a scaled full-color image (Scale 1). In other embodiments, the pyramid generation circuit 408 may receive raw image data (e.g., Bayer image data 410 and/or Quadra image data 412) for which to generate a raw image pyramid, bypassing the multi-mode demosaicing circuit 404 and the front-end scaler circuit 406.

Figure 6:
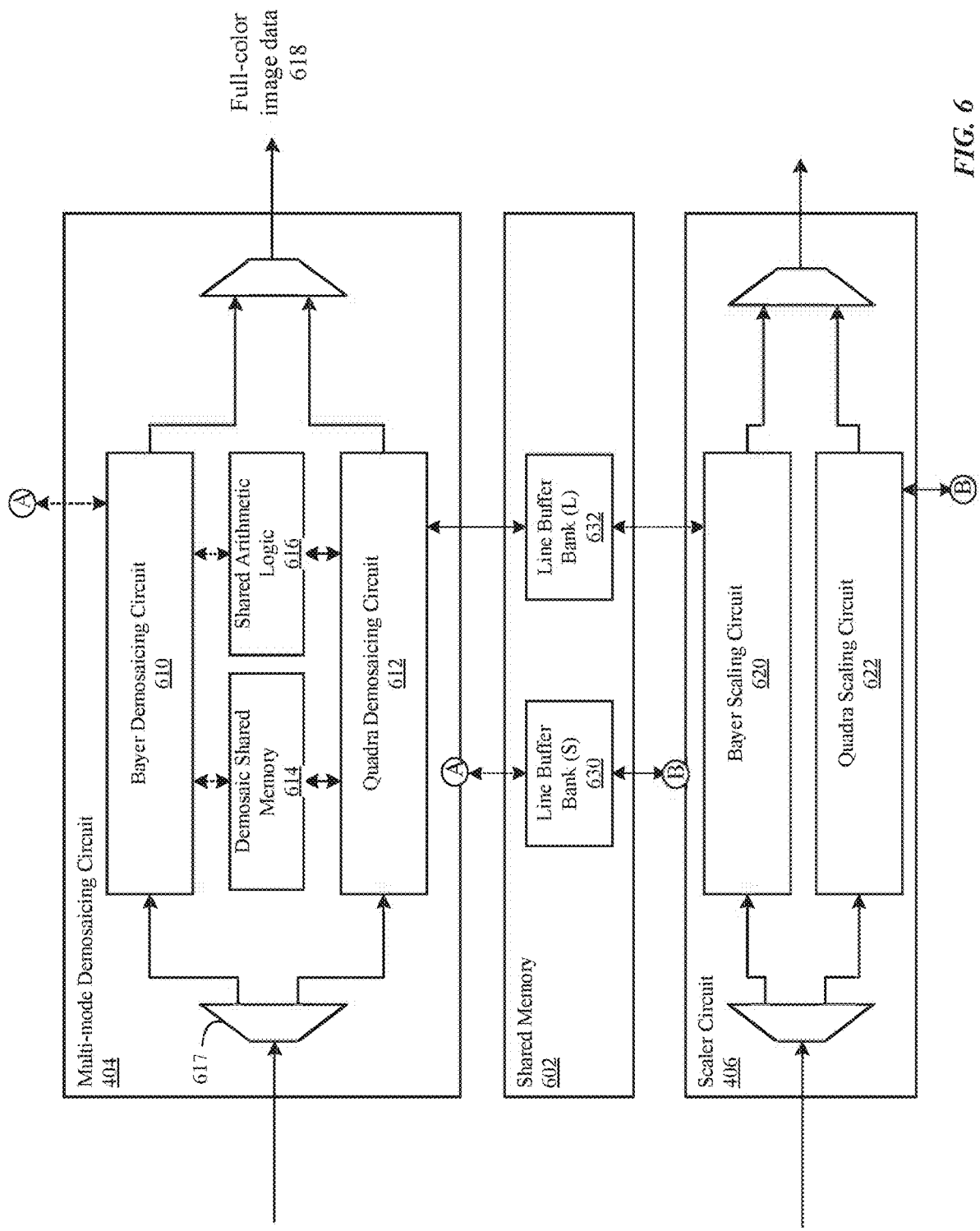
FIG. 6 is a block diagram of a more detailed view of the multi-mode demosaicing circuit and the scaling circuit, in accordance with some embodiments.

FIG. 6 is a block diagram of a more detailed view of the multi-mode demosaicing circuit 404 and the scaling circuit 406, in accordance with some embodiments. As illustrated in FIG. 6, the multi-mode demosaicing circuit 404 may comprise different circuitry for demosaicing image data received in different image formats, such as a Bayer demosaicing circuit 610 for demosaicing Bayer image data, and a Quadra demosaicing circuit 612 for demosaicing Quadra image data. The multi-mode demosaicing circuit 404 includes logic circuitry 617 (e.g., a demultiplexor) configured to receive raw image data, determine a format of the received image data, and transmit the received image data to an appropriate demosaicing circuit for demosaicing (e.g., Bayer image data to the Bayer demosaicing circuit 610, or Quadra image data to the Quadra demosaicing circuit 612) to output full-color image data 618.

The Bayer demosaicing circuit 610 and the Quadra demosaicing circuit 612 access a demosaic shared memory 614 for use as working memory when performing demosaicing operations on received image data. In some embodiments, the demosaic shared memory 614 includes a set of line buffers used by the Bayer demosaicing circuit 610 and the Quadra demosaicing circuit 612 for storing working data when performing linear interpolation, gradient calculations, gaussian filtering, weighted averaging, etc. In some embodiments, the multi-mode demosaicing circuit 404 is configured such that only one of the Bayer demosaicing circuit 610 and the Quadra demosaicing circuit 612 are operating at a given time. As such, the Bayer demosaicing circuit 610 and the Quadra demosaicing circuit 612 may each utilize the full capacity of the demosaic shared memory 614 during operation.

In addition, the Bayer demosaicing circuit 610 and the Quadra demosaicing circuit 612 may utilize shared arithmetic logic 616 when demosaicing image data. For example, in some embodiments, the shared arithmetic logic 616 includes circuitry for performing operations such as division of fixed numbers, interpolation functions, logarithm and/or exponential functions, algebraic functions, etc. used by both the Bayer demosaicing circuit 610 and the Quadra demosaicing circuit 612. For example, in some embodiments, the Bayer demosaicing circuit 610 and the Quadra demosaicing circuit 612 may both include a gradient filter and/or a weighted averaging circuit that make use of the shared arithmetic logic 616 for performing certain operations.

The front-end scaler circuit 406 is configured to receive full-color image data 618 generated by the multi-mode demosaicing circuit 404, and includes one or more scaling circuits configured to performing scaling operations based on different image formats in which the image data was originally received by the multi-mode demosaicing circuit 404. For example, as illustrated in FIG. 6, the front-end scaler circuit 406 includes a Bayer scaling circuit 620 configured to perform scaling on image data that was originally received in Bayer format, and a Quadra scaling circuit 622 configured to perform scaling on image data originally received in Quadra format. In other words, even though the image data 618 output by the multi-mode demosaicing circuit 404 and received by the front-end scaler circuit 406 may be full-color RGB image data regardless of whether the multi-mode demosaicing circuit 404 originally received the image data as Bayer image data or Quadra image data, the front-end scaler circuit 406 may be configured to perform different operations on the image data 618 depending on whether it was originally Bayer or Quadra image data.

In some embodiments, the front-end scaler circuit 406 performs different post-processing operations on the image data 618 based on its original raw image format, due to differences in how image data of different formats may be demosaiced. For example, because the pixels of Quadra image data are arranged in 2×2 blocks, pixels of the same color may have neighboring pixels of different colors, causing interpolation issues that may lead to poor diagonal sampling. For example, as illustrated in the kernel 502 in FIG. 5, the red pixel R1 is located adjacent to green pixels along the right upward diagonal, allowing for interpolation based on nearby green pixels in the right upward diagonal direction to be performed easily. On the other hand, the adjacent red pixel 504 is not positioned near green pixels along the right upward diagonal direction, which may contribute to jaggy diagonal edges when interpolated. In some embodiments, the Quadra scaling circuit 622 performs additional post-processing operations, e.g., additional dot-fix and chroma suppression operations, in comparison to the Bayer scaling circuit 620, e.g., to refine diagonal lines to compensate for poor diagonal sampling when interpolating Quadra raw image data, whereas such operations may not be necessary when post-processing Bayer raw image data, in which the position of green pixels are equally distributed relative to each non-green pixel of the raw image data. The operations of the Bayer scaling circuit 620 and the Quadra scaling circuit 622 are discussed in greater detail below.

The multi-mode demosaicing circuit 404 and the front-end scaler circuit 406 access a shared memory 602 for use as working memory when performing demosaicing, post-processing, and scaling operations. In some embodiments, the shared memory 602 contains multiple banks of line buffers usable by both the multi-mode demosaicing circuit 404 and the front-end scaler circuit 406. In some embodiments, the shared memory 602 contains a first bank of line buffers 630 and a second bank of line buffers 632, where the second bank of line buffers 632 contains a larger number of line buffers in comparison to the first bank 630.

FIG. 6 illustrates access by the Bayer demosaicing circuit 610, Quadra demosaicing circuit 612, Bayer scaling circuit 620, and Quadra scaling circuit 622 to the line buffer banks 630 and 632 (as well as access by the Bayer demosaicing circuit 610 and Quadra demosaicing circuit 612 to the demosaic shared memory 614 and shared arithmetic logic 616) during different modes of operation by the demosaic processing circuit). For example, FIG. 6 illustrates access to the line buffer banks 630/632 during a first mode of processing of raw Bayer image data using dotted lines, while access to the line buffer banks 630/632 during a second of processing raw Quadra image data using solid lines.

Because the Quadra demosaicing circuit 612 may utilize additional working memory when demosaicing Quadra image data in comparison to the Bayer demosaicing circuit 610 when demosaicing Bayer image data, the Quadra demosaicing circuit 612 may access the second bank of line buffers 632 when performing demosaicing (as indicated by a solid line between Quadra demosaicing circuit 612 and the second line buffer bank 632), while the Bayer demosaicing circuit 610 accesses the smaller first bank of line buffers 630 when performing demosaicing (as indicated by a dotted line between Bayer demosaicing circuit 610 and the first line buffer bank 630, via "A"). On the other hand, the Quadra scaling circuit 622 may access the first bank of line buffers 630 when performing post-processing and scaling on image data generated by the Quadra demosaicing circuit 612 (via "B"), while the Bayer scaling circuit 620 accesses the second bank of line buffers 632 when performing post-processing and scaling on image data generated by the Bayer demosaicing circuit 610. In other words, the Quadra scaling circuit 622 may have access to smaller amount of memory of the shared memory 602 in comparison the Bayer scaling circuit 620.

In some embodiments, the Quadra scaling circuit 622 performs its post-processing and scaling operations with reduced memory consumption in comparison to the Bayer scaling circuit 620 by discarding a portion of its received image data (e.g., certain lines of image data), and later reconstructing the discarded image data (e.g., reconstructing the discarded lines through interpolation).

Although FIG. 6 illustrates the scaler circuit 406 as having separate scaling circuits for Bayer and Quadra, it is understood that in some embodiments, the same scaling circuit or portions thereof may be used for scaling both Bayer and Quadra image data. In some embodiments, the scaler circuit 406 may utilize different settings when scaling Quadra image data compared to when scaling Bayer image data, such as utilizing different filter kernels, performing different functionality (e.g., to reduce memory consumption when processing Quadra image data in comparison to Bayer image data, as discussed above), accessing different banks of line buffers in the shared memory, etc.

By utilizing shared memory 602 used by both the multi-mode demosaicing circuit 404 and the front-end scaler circuit 406, Quadra image processing functionality may be added to legacy Bayer image processing circuits, without significantly increasing an amount of area on chip needed for memory. For example, because Quadra demosaicing may utilize larger filters in comparison to Bayer demosaicing, thus requiring additional memory, operations of the front-end scaler circuit are modified (e.g., by discarding a portion of the image data so that a smaller amount of image data needs to be processed) to reduce memory usage, allowing for the combined circuit to utilize a similar amount of memory when processing Quadra image data in comparison to when processing Bayer image data, so that the same memory (e.g., shared memory 602) is efficiently utilized in either image processing mode.

Quad Bayer Demosaicing

Figure 7:
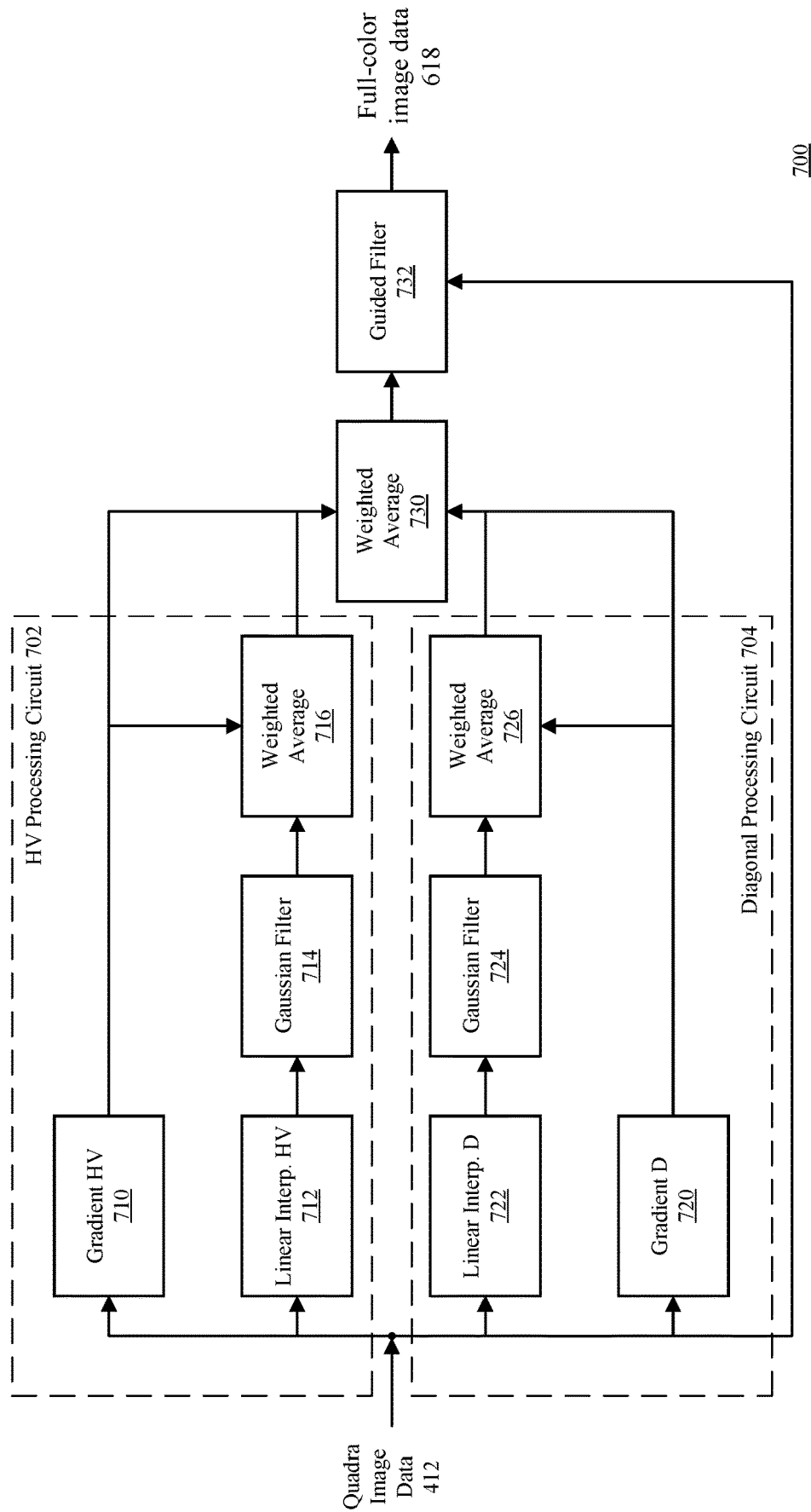
FIG. 7 illustrates a block diagram of a Quadra demosaicing circuit, in accordance with some embodiments.

FIG. 7 illustrates a block diagram of a Quadra demosaicing circuit, in accordance with some embodiments. The Quadra demosaicing circuit 700 illustrated in FIG. 7 may correspond to the Quadra demosaicing circuit 612 illustrated in FIG. 6. The Quadra demosaicing circuit 700 is configured to demosaic received raw Quadra image data 412 by first producing a complete green color image, and, based on the produced green image, generate red and blue color images to produce full-color image data 618 (e.g., RGB image data).

The Quadra demosaicing circuit 700 includes a Horizontal/Vertical (HV) processing circuit 702 and a diagonal processing circuit 704, each containing a respective linear interpolation circuit (e.g., linear interpolation HV circuit 712 and linear interpolation diagonal circuit 722) and a respective directional Gaussian filter circuit (e.g., Gaussian filter circuits 714 and 724) to perform linear interpolation and filtering on the raw Quadra image data in the horizontal/vertical and diagonal directions respectively, a respective gradient calculation circuit (e.g., gradient HV circuit 710 and gradient diagonal circuit 720) to determine directional gradients based on the raw Quadra image data, and respective aggregation circuits (e.g., weighted averaging circuits 716 and 726) to output an aggregation of the generated linear interpolation data based on the determined gradient data. The output of the HV processing circuit 702 and the diagonal processing circuit 704 is aggregated by a weighted average circuit 730 to generate a complete green image. The guided filter 732 uses the complete green image and the raw Quadra image data to generate complete red and blue images, which are combined with the complete green image to yield a full-color RGB image. Although FIG. 7 illustrates a Quadra demosaicing circuit 700 with separate HV and diagonal processing circuits 702 and 704, it is understood that in some embodiments, the HV and diagonal processing circuits may share circuit elements. For example, in some embodiments, a single interpolation circuit may be used to perform interpolation in HV and diagonal directions.

The linear interpolation HV circuit 702 and linear interpolation diagonal circuit 712 (collectively, linear interpolation circuits 702/712) of the Quadra demosaicing circuit 700 are each configured to perform linear interpolation on the raw Quadra input data in specified directions, to generate a green value for each non-green pixel of the image data. For example, to perform interpolation in the horizontal direction, the linear interpolation circuit HV circuit 702 determines, for each non-green pixel, a green value based on the values of nearby pixels along the horizontal direction (e.g., on the same row). As such, the linear interpolation circuit is configured to output an image of green pixels, including the original green pixels of the image data, and interpolated green pixels replacing the red and blue pixels of the original image data.

In some embodiments, the value of each interpolated pixel is calculated based on a low pass value (LPV) and a high pass value (HPV). The LPV is calculated based on the interpolation of the neighboring green pixels along the specified direction of interpolation, as discussed above, while the HPV is based upon the original non-green value (i.e., red or blue) of interpolated pixel. In some embodiments, the HPV may also be referred to as the residual. For example, the green value of a given red pixel (e.g., LPV) may further be modified based upon the values of nearby red pixels along the specified direction (e.g., using the HPV or residual, which is determined based on a value of the red pixel, as well as nearby same-color pixels along the direction of interpolation). In some embodiments, a value of the residual may be clipped based upon one or more specified threshold values.

In some embodiments, mixing information from red or blue color information (e.g., the residual) is done to enhance the resolution of the green channel. However, due to sparse sampling associated with the Quadra image format, the green pixels and red/blue pixels may not represent the same data. As such, in some embodiments, the amount of the residual that is used to modify the interpolated green value for a pixel is based upon a calculated residual weight that is based on a statistical correlation between the nearby green and red or blue pixels.

In some embodiments, prior to interpolation, the linear interpolation circuit 712/722 analyzes the pixels of the raw Quadra image data to exclude certain pixels from interpolation. For example, in some cases an image may contain pixels, referred to as "bright dots," having high saturation values relative to surrounding pixels, such as in an image of sunlight shining through foliage. In other cases, bright dots may correspond to missed defective pixels. If interpolated normally, the saturation of the pixel may be spread around to surrounding pixels, creating visual artifacts, such as an undesirable cross or box, around the bright dot. As such, in some embodiments, when interpolating a value of a given pixel, a nearby pixel may be excluded from interpolation if the value of the nearby pixel exceeds a threshold amount (e.g., excluded from being included in the interpolation of the neighboring green pixels, or from the determination of the residual value). In some embodiments, the threshold is defined based on a signal value of the pixel being interpolated. For example, in some embodiments the user may define a curve mapping threshold levels to different signal levels, where pixels above the threshold are excluded from the interpolation. In some embodiments, the signal level of the pixel being interpolated is determined based on an analysis of a neighborhood surrounding pixels (e.g., a 3×3 neighborhood of pixels), e.g., as a minimum pixel value, maximum pixel value, average pixel value, or some combination thereof of the neighborhood of surrounding pixels. The determined signal value is mapped to a threshold value for excluding bright pixels. In some embodiments, the threshold value is determined per color channel. In some embodiments, the threshold value may be set as a difference over an intensity value of the pixel being interpolated, instead of an absolute intensity level.

In some embodiments, the Gaussian filter circuits 714 and 724 include a directional Gaussian filter, a dot fix circuit, and an orthogonal low-pass filter (LPF). The directional Gaussian filter is configured to smooth and reduce noise of the interpolated green pixels generated by the linear interpolation circuit 702 or 712 by applying a directional Gaussian kernel on the received pixels. The dot fix circuit is configured to perform dot fixing operations on received image data. For example, in some embodiments, the dot fix circuit is configured to remove dots by analyzing the values of a center pixel and two or more neighboring pixels along a specified direction (e.g., the same direction in which interpolation was performed) to determine a minimum, maximum and median pixel value. If a difference between the minimum and maximum exceeds a dot fix threshold value and the center pixel has either the minimum or maximum value, then the dot fix circuit sets the value of the center pixel to the determined median pixel value. In some embodiments, the directional Gaussian filter may be bypassed (e.g., by setting a strength of the directional Gaussian filter to 0), such that the interpolated green pixels generated by the linear interpolation circuit 702 or 712 is received directly by the dot fix circuit.

The orthogonal LPF is configured receive interpolated image data, and to apply a directional low-pass filter that is orthogonal to a direction in which the image data was interpolated, in order to reduce fixed pattern noise that may be generated by the interpolation. For example, when interpolating Quadra image data, noise present in certain pixels may be elongated by the interpolation, creating lines in the image in the direction of the interpolation, e.g., vertical interpolation would elongate the noise in a vertical direction, creating vertical lines. This may be especially noticeable in areas of images depicting flat surfaces or uniform colors, such as a patch of sky or a solid-color shirt. In addition, some image sensors configured to capture Quadra image data may experience gain and shift issues, where neighboring 2×2 blocks of green pixels may capture different raw image data even when the underlying color being captured should be the same. These differences may result in fixed pattern noise when the raw image data is interpolated.

In order to reduce fixed pattern noise, the orthogonal LPF applies a low-pass filter kernel to the interpolated image data in a direction that is orthogonal to the direction in which the image data was interpolated. For example, when a horizontal LPF kernel is applied to image data that was vertically interpolated, the vertical lines caused by fixed pattern noise are reduced, due to blending with adjacent pixels in a horizontal direction. Thus, by applying an orthogonal LPF, false patterns caused by fixed pattern noise may be removed.

The gradient HV circuit 710 and gradient diagonal circuit 720 (collectively, gradient calculation circuits) are configured to calculate gradients within a received image, which are used to determine directional gradient weight values for combining image data interpolated along different directions (e.g., combining vertically-interpolated and horizontally-interpolated image data, image data interpolated in different diagonal directions). In some embodiments, a directional gradient weight for a pixel is determined by analyzing a window of surrounding pixels (e.g., a 7×7 window). In some embodiments, due to the pixels in Quadra image data being grouped into 2×2 blocks, gradient calculation for Quadra image data may use a larger window in comparison to that used for determining gradient values for other image formats (e.g., Bayer images).

In some embodiments, different combinations of filter windows may be applied to the raw image data to generate gradient values corresponding to different directions. For example, in some embodiments, a horizontal or vertical gradient value may be determined based upon applying a second-order filter and a first-order filter to the raw image data. On the other hand, diagonal gradient values may be determined based upon applying a first-order filter to the raw image data, but not a second-order filter. In some embodiments, gradient weight values are calculated only for pixels of the received image data (e.g., Quadra image data 412). For example, in some embodiments, the gradient calculation circuits 710/720 are configured to calculate gradient weight values for pixels of certain color channels (e.g., only red and blue pixels, but not green pixels).

Weighted average circuits 716 and 726 are configured to combine the interpolated image data generated by the linear interpolation circuits 712/722, based upon the gradients generated by the gradient calculation circuits 710/720. For example, the weight average circuit 716 combines horizontally interpolated green image data (Gh) and vertical interpolated green image data (Gv) generated by the linear interpolation HV circuit 702 (and filtered through the Gaussian filter 704), based on horizontal and vertical gradient weight values Wh and Wv generated by the gradient calculation circuit 710, to generate a weighted average Ghv. Similarly, the weight average circuit 726 combines green image data interpolated along two different diagonal directions (Gd1 and Gd2), based on gradient weight values along those diagonal directions (Wd1 and Wd2) to generate a weighted average Gd. Weighted average circuit 730 is configured to combine the output image data of the weighted average circuits 716 and 726, corresponding to a full green image processed in the horizontal and vertical directions Ghv and a full green image processed in both diagonal directions Gd, into a final full green image.

The guided filter 732 produces red and blue color image planes using the previously generated green image plane as a similarity measure. In some embodiments, the guided filter 732 calculates, for each of red and blue, red and blue values for the pixels missing that color, and also replaces the original red and blue pixels. In some embodiments, the guided filter 732 functions as a low pass on the red and blue channels mixed with a high frequency of the green channel, where the amount of high frequency that is added from green to the red and blue values is based upon a covariance of the two signals. The guided filter 732 thus uses the original raw Quadra image data and the full green image to generate full red and blue images. The full green, red, and blue images are combined to form a full-color (e.g., RGB) image as the output of the Quadra demosaicing circuit 612.

Front-End Scaler Circuit

As discussed above, the front-end scaler circuit (e.g., the front-end scaler circuit 406 illustrated in FIGS. 4 and 6, also referred to as scaler circuit 406) is configured to receive demosaiced image data from the multi-mode demosaicing circuit (e.g., multi-mode demosaicing circuit 404), and perform additional post-processing operations (e.g., chroma aliasing artifact suppression and/or dot-removal operations) and/or scaling of the received image data, based on the requirements of the subsequent operations to be performed on the image.

Even though the output of the multi-mode demosaicing circuit that is received by the front-end scaler circuit may be of the same image format (e.g., RGB image format) regardless of whether the original raw image data received by the multi-mode demosaicing circuit was Bayer or Quad Bayer image data, the front-end scaler circuit may nevertheless process the received image data differently, depending on the format of the original raw image data. For example, the front-end scaler circuit 406 may include a Bayer scaling circuit 620 configured to perform scaling on image data that was originally received in Bayer format (referred to as Bayer image mode), and a Quadra scaling circuit 622 configured to perform scaling on image data originally received in Quadra format (referred to as Quadra image mode). As discussed above, in some embodiments, the Bayer scaling circuit 620 and Quadra scaling circuits 622 are not wholly separate circuits, but may correspond to different configurations of the scaler circuit 406.

Figure 8A:
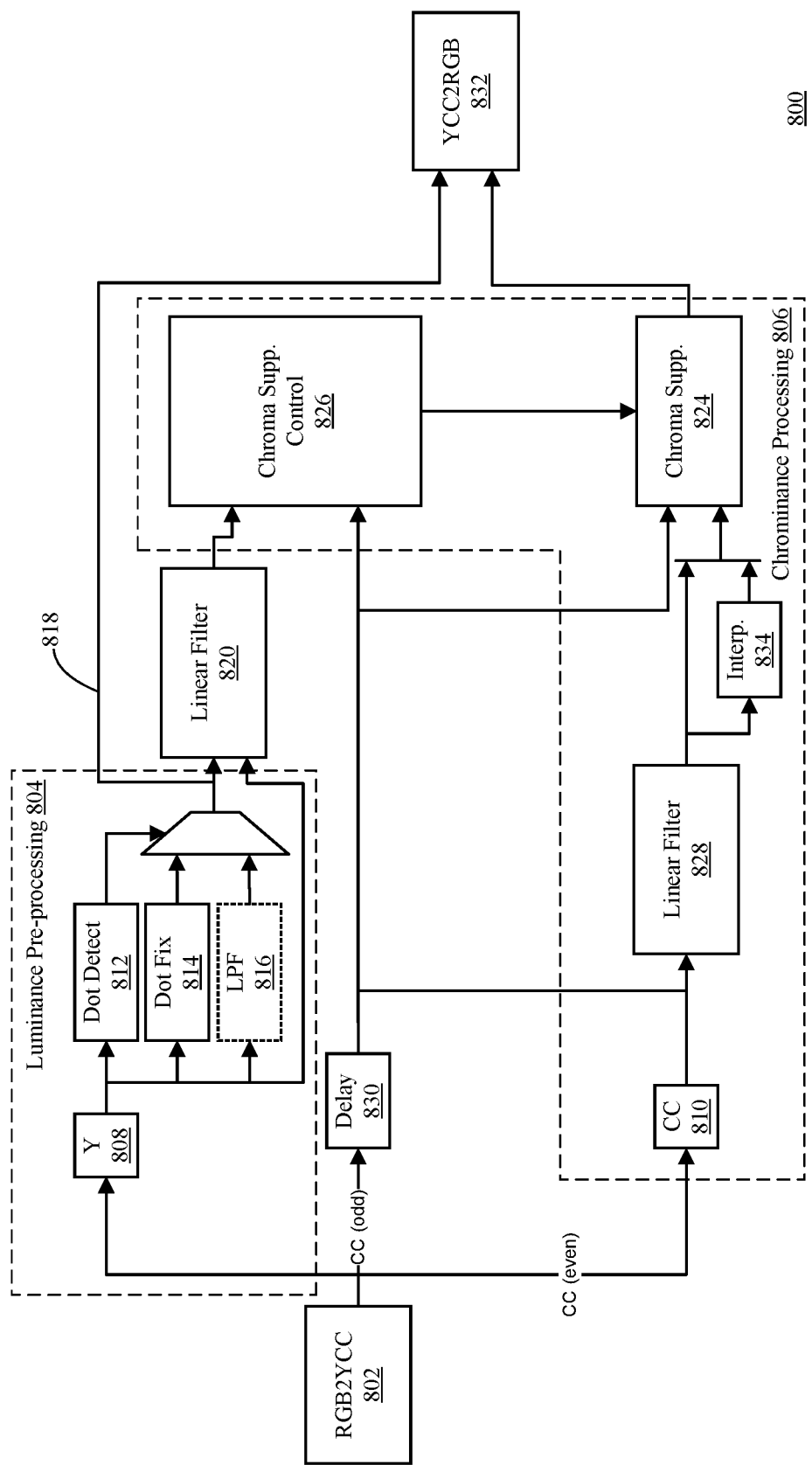
FIG. 8A illustrates a block diagram of a front-end scaler circuit configured to perform post-processing on received image data in Bayer mode, in accordance with some embodiments.
Figure 8B:
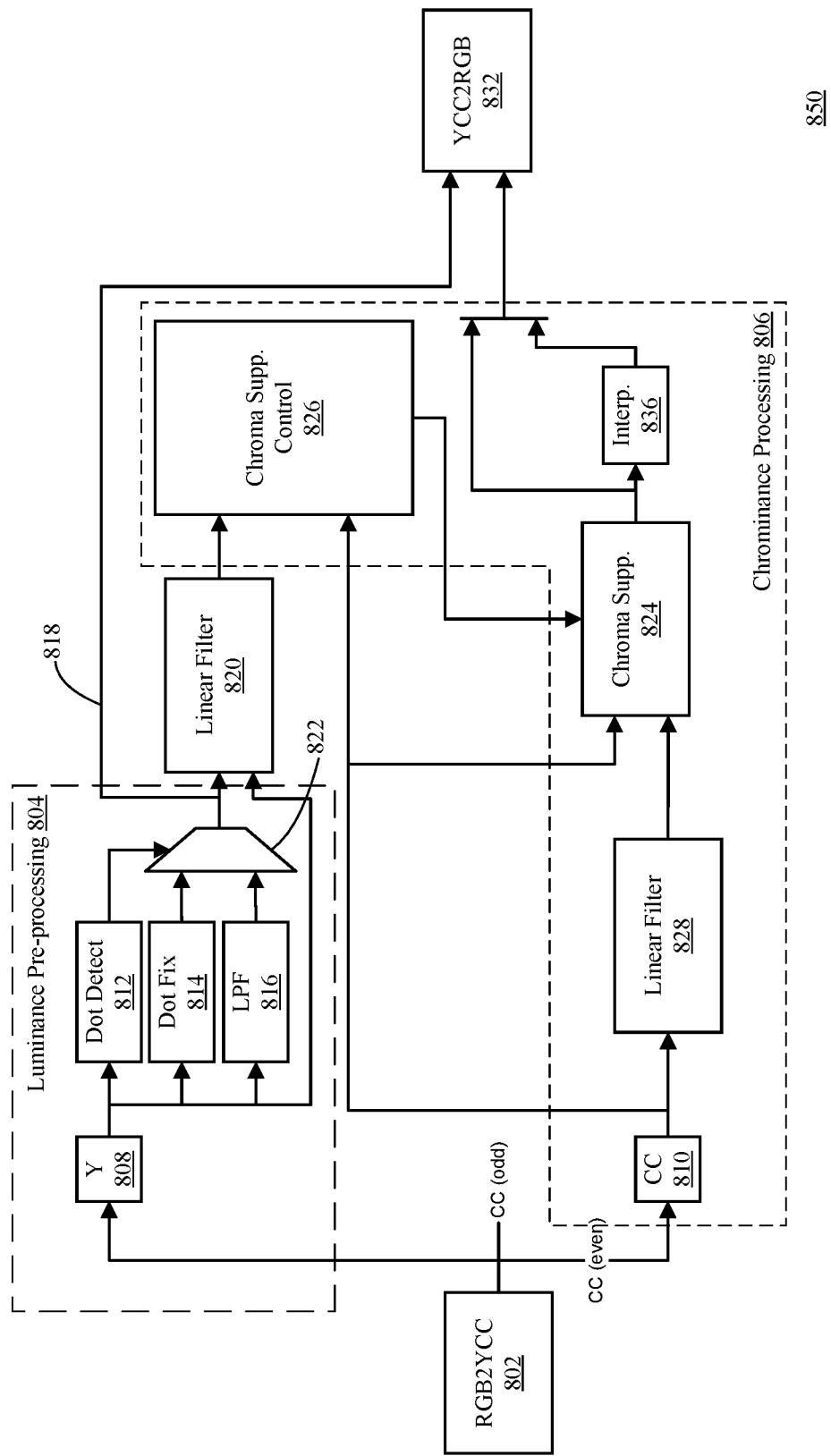
FIG. 8B illustrates a block diagram of a front-end scaler circuit configured to perform post-processing on received image data in Quadra mode, in accordance with some embodiments.

FIG. 8A illustrates a block diagram of a front-end scaler circuit configured to perform post-processing on received image data in Bayer mode, in accordance with some embodiments. FIG. 8B illustrates a block diagram of a front-end scaler circuit configured to perform post-processing on received image data in Quadra mode, in accordance with some embodiments. The front-end scaler circuit 800 illustrated in FIG. 8A may correspond to the Bayer scaling circuit 620 of the front-end scaler circuit 604 illustrated in FIG. 6, while the front-end scaler circuit 850 illustrated in FIG. 8B may correspond to the Quadra scaling circuit 622 of the front-end scaler circuit 604 illustrated in FIG. 6. Elements common used by the front-end scaler circuits in both Bayer image mode and Quadra image mode are illustrated in FIGS. 8A and 8B using common reference numerals. For example, in some embodiments, the front-end scaler circuits 800 and 802 each include an RGB-to-YCC conversion circuit 802, a luminance pre-processing circuit 804, and a chrominance processing circuit 806.

The RGB-to-YCC conversion circuit 802 is configured to receive demosaiced image data (e.g., RGB image data from the multi-mode demosaicing circuit), and convert the image data in YCC image data (e.g., YCbCr format image data). The luminance component (Y) and the chrominance component (CC) of the converted image data are separated and processed separately, e.g., the luminance component by the luminance pre-processing circuit 804, and the chrominance component by the chrominance processing circuit 806. In some embodiments, luminance component and chrominance components are stored in respective sets of line buffers (e.g., luminance line buffers 808 and chrominance line buffers 810) in preparation for further processing. In some embodiments, the luminance line buffers 808 and chrominance line buffers 810 correspond to portions of the shared memory 602 accessible to the scaler circuit 406, based on the current mode of operation of the scaler circuit 406 (e.g., line buffer bank 632 when the scaler circuit is operating in Bayer mode, or line buffer bank 630 when the scaler circuit is operating in Quadra mode).

Luminance Pre-Processing in Bayer and Quadra Image Modes

The luminance pre-processing circuit includes a dot detect circuit 812 and a dot fix circuit 814 (collectively referred to as legacy dot fix). In some embodiments, the dot detect and dot fix circuits 812 and 814 are configured to detect and fix dots in the image data, which may correspond to demosaicing artifacts or may be caused by the long-tail of noise distribution. In some embodiments, a given pixel is marked as a dot pixel based on an analysis of pixels within a neighborhood of the given pixel (e.g., a 3×3 neighborhood of pixels centered on the given pixel), if a luminance level of the given pixel exceeds a maximum luminance of its neighborhood pixels (not including the given pixel) by at least a threshold amount, or is lower than a minimum luminance of its neighborhood pixels by at least a threshold amount. In some embodiments, the threshold amount is based on a luminance level of the given pixel and/or a luminance level of one or more nearby pixels. If the dot detect circuit 812 determines that a pixel corresponds to a bright dot, the dot fix circuit 814 replaces with a value determined based upon a lowest gradient direction associated with the pixel.

In some embodiments, the luminance pre-processing circuit 804 may further include a directional low-pass filter (LPF) circuit 816. The directional LPF circuit 816 is configured to refine or smooth lines in the demosaiced image data, and perform dot fix and noise reduction operations. Operations of the directional LPF circuit 816 are discussed in greater detail below in relation to FIGS. 8B and 9. In some embodiments, the front-end scaler circuit 800 is configured to select between legacy dot fix and the directional LPF circuit 816. For example, in some embodiments, legacy dot fix is used when operating in Bayer mode, while the directional LPF circuit 816 is used when the scaler circuit is operating in Quadra mode.

The output 818 of the luminance pre-processing circuit 804 corresponds to a processed luminance component $Y_{out}$ of the received image data. In addition, the output luminance component of the image data 818 may be used to control a level of chromatic suppression to be performed on the chrominance component of the received image data (e.g., by the chrominance processing circuit 806). For example, as illustrated in FIGS. 8A and 8B, the processed luminance component data $Y_{out}$ is passed through a linear filter circuit 820 (e.g., a 5×5 linear filter) to generate an input for a chroma suppression control circuit 826. In some embodiments, the output of the linear filter circuit 820 includes a maximum luminance value $Y_{max}$ (e.g., corresponding to a maximum luminance value within a 5×5 neighborhood of each pixel) and/or a high frequency luminance $Y_{HF}$ (e.g., corresponding to an absolute value after convolving input luminance with a 5×5 symmetric linear filter). In some embodiments, the linear filter 820 may receive the output luminance 818 as well as the original unprocessed luminance data (e.g., from luminance line buffers 808), and may operate on a combination of the processed output luminance 818 and unprocessed luminance data. For example, in some embodiments, the linear filter 820 may use the output luminance 818 for at least a portion of the 5×5 neighborhood analyzed for each pixel (e.g., a center row of the 5×5 neighborhood), and used the original unprocessed luminance for a remaining portion of the analyzed 5×5 neighborhood.

As discussed above, when the scaler circuit operates in Quadra mode (e.g., scaler circuit 850 illustrated in FIG. 8B), the scaler circuit 406 may utilize different settings when scaling Quadra image data compared to when scaling Bayer image data, such as utilizing different filters or filter kernels, and performing different functionality (e.g., to reduce memory consumption when processing Quadra image data in comparison to Bayer image data, as discussed above), etc. In Quadra mode, similar to when in Bayer mode, received image data is converted by the RGB-to-YCC conversion circuit 802 to YCC image data. Because the image data received by the scaler circuit may be RGB image data, regardless of whether the original raw image data was Bayer image data or Quadra image data, the RGB-to-YCC conversion circuit 802 may operate identically when the scaler circuit is operating in Quadra mode compared to when in Bayer mode.

The luminance pre-processing circuit 804 may be configured to, in Quadra mode, select between processing the luminance component data using legacy dot fix or using the directional LPF circuit 816. In some embodiments, the luminance pre-processing circuit 804 automatically selects the directional LPF circuit 816 for processing the luminance values when operating in Quadra mode.

Figure 9:
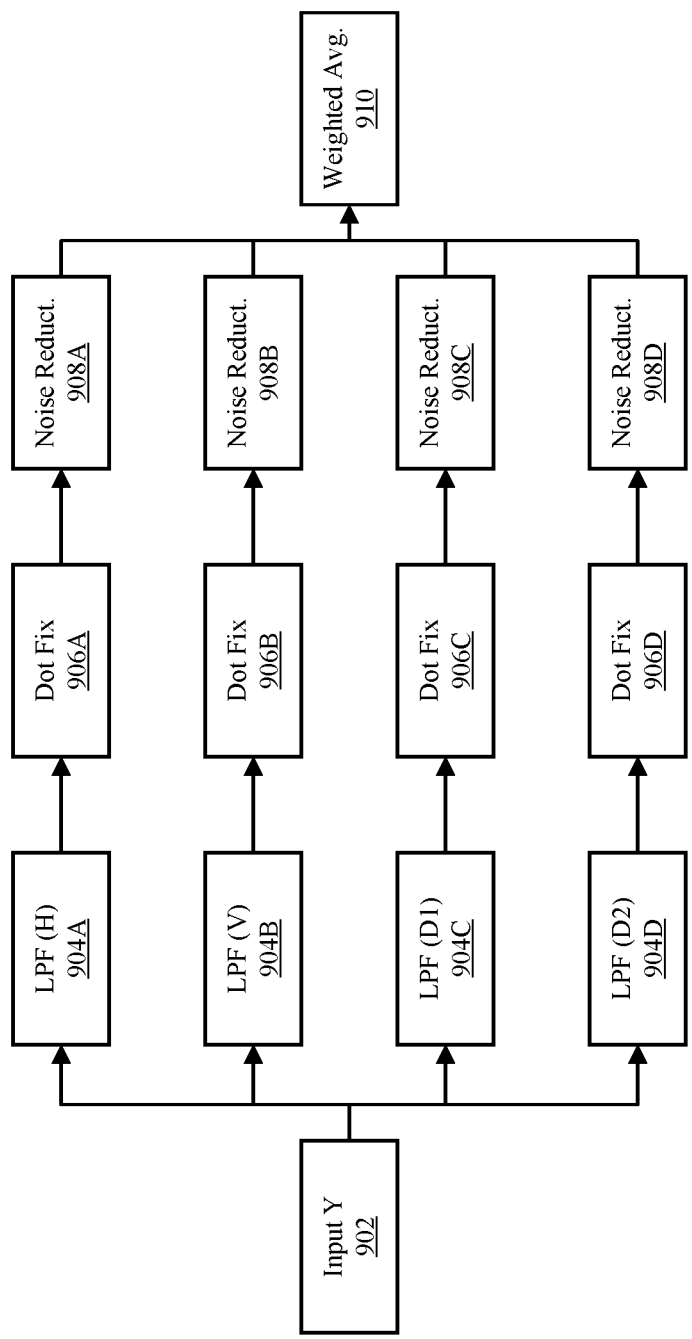
FIG. 9 illustrates a block diagram of the directional LPF circuit, in accordance with some embodiments.

FIG. 9 illustrates a block diagram of the directional LPF circuit, in accordance with some embodiments. The directional LPF circuit 900 illustrated in FIG. 9 may correspond to the directional LPF circuit 816 illustrated in FIGS. 8A and 8B. The directional LPF circuit 900 receives input luminance values 902, and generates a plurality of directional low pass signals corresponding to a plurality of directions by passing the input luminance values 902 through a respective low-pass filter 904 corresponding to each direction. For example, as illustrated in FIG. 9, the low-pass filters 904 may include a horizontal low-pass filter 904a, a vertical low-pass filter 904b, a low-pass filter corresponding to a first diagonal direction (D1) 904c, and a low-pass filter corresponding to a second diagonal direction (D2) 904d. In some embodiments, passing the input luminance 902 through the plurality of low-pass filters 904 to generate a plurality of low pass signals corresponding to different directions acts as a reversal of the weighted averaging performed at the demosaicing circuit (e.g., weighted averaging performed by the weighted average circuit 730 of the Quadra demosaicing circuit 700) that combined image data corresponding to different directions to form the input image data to the scaler circuit 850.

In some embodiments, the low-pass filters 904a-d implement bright dot skip functionality, to prevent the saturation of certain pixels (referred to as "bright dots") having high luminance values relative to surrounding pixels from being spread around to surrounding pixels and creating visual artifacts. Bright dots may correspond to naturally bright points within an image (e.g., sunlight shining through foliage), or may correspond to missed defective pixels. In some embodiments, a pixel within a filter window of a given center pixel is considered to be a bright dot if the luminance of the pixel exceeds a threshold amount, where the threshold is determined based upon a minimum or maximum luminance value within the filter window. If a pixel is determined to be a bright dot, then the pixel may be excluded from use in low pass filtering for determining the filtered value of nearby pixels.

In some embodiments, each of the plurality of directional low pass image signals is passed through a respective dot fix circuit 906 (e.g., dot fix circuits 906a, 906b, 906c, and 906d corresponding to low pass filters 904a, 904b, 904c, and 904d, respectively). Each dot fix circuit 906 is configured to perform dot fixing operations on received image data, e.g., by analyzing the values of a center pixel and two or more neighboring pixels along a respective direction (e.g., the same direction associated with the respective low pass filter 904) to determine a minimum, maximum and median pixel value. If a difference between the minimum and maximum exceeds a dot fix threshold value and the center pixel has either the minimum or maximum value, then the dot fix circuit 906 sets the value of the center pixel to the determined median pixel value. In some embodiments, the dot fix circuits 906 may be bypassed.

The directional LPF circuit 900 further includes, for each of the plurality of directional low pass signals, a respective noise reduction circuit 908 (e.g., noise reduction circuits 908a, 908b, 908c, and 908d corresponding to the horizontal, vertical, first diagonal, and second diagonal directions, respectively) that receives and performs one or more noise reduction operations on its corresponding directional low pass image signal. In some embodiments, noise reduction is performed on each of the directional low-pass image signals to refine or smooth lines in the demosaiced image data, particularly in the diagonal directions. This is because raw Quadra image data may experience poor diagonal sampling, resulting in noisy diagonal lines in the demosaiced image in some embodiments. By performing the noise reduction operations after the image data has been demosaiced, lines (e.g., diagonal lines) in the image may be refined while avoiding potential sampling issues from using raw Quadra image data.

In some embodiments, each noise reduction circuit 908 comprises a gradient calculation circuit that determines a gradient of the received directional low pass image signal in the corresponding direction, to be used in noise reduction operations. For example, in some embodiments, each noise reduction circuit 908a-d corrects fixed-pattern noise from the image sensor by averaging pixel values within a designated pixel window (e.g., 5×5 window surrounding each pixel), and mixing with a directional low-pass signal based on gradient strength. In some embodiments, the averaging is performed on the original luminance data (e.g., input luminance values 902), the results of which are mixed with the directional low-pass signal generated by the low-pass filters 904 based upon the gradient values determined by the gradient calculation circuit.

In some embodiments, the noise reduction circuit 908 determines an amount of averaging to be applied to each pixel by comparing a maximum gradient value at each pixel with one or more thresholds, where each threshold is mapped to respective level of averaging. In some embodiments, the one or more thresholds may corresponds to one or more frequency values of interest, which may be indicated using an array (e.g., a 1-D array).

The directional LPF circuit further includes a weighted averaging circuit 910 configured to receive the noise-reduced image data corresponding to each of the plurality of directions (e.g., horizontal, vertical, and first and second diagonal directions), and combine the received noise-reduced image data using weighted averaging. In some embodiments, each signal associated with a respective direction is weighted based upon the determined gradient values for that direction (e.g., as determined by the respective gradient calculation circuits of the noise reduction circuits 908). The combined signal corresponds to a processed luminance component $Y_{out}$ of the received image data.

As such, the processed luminance component $Y_{out}$ of the received image data may be generated either using the dot detect and dot fix circuits 812 and 814 (legacy dot fix) or using the directional LPF circuit 816. In some embodiments, the scaler circuit is configured to use legacy dot fix to generate the processed luminance $Y_{out}$ when in Bayer image mode, and to use the directional LPF circuit 816 to generate the processed luminance $Y_{out}$ when in Quadra image mode. For example, in some embodiments, the scaler circuit comprises logic circuitry configured to select between legacy dot fix and directional LPF, based upon the operating mode of the scaler circuit. In some embodiments, as illustrated in FIG. 8A, the directional LPF circuit 816 may also be used in Bayer image mode.

In some embodiments, when operating in Quadra image mode, the scaler circuit is configured to use an output of the directional LPF circuit 816 as the processed luminance $Y_{out}$, except for pixels determined by the dot detect circuit 812 as corresponding to bright dots, in which case legacy dot fix may be used. For example, FIG. 8B illustrates the scaler circuit 850 including a multiplexor 822 configured to select between an output of the dot fix circuit 814 and the directional LPF circuit 816 for a given pixel, based upon whether the dot detect circuit 12 has determined the pixel to be a bright dot. In other embodiments, the directional LPF circuit 816 may include circuitry for performing dot fix operations, allowing for legacy dot fix to be bypassed entirely. In some embodiments, the front-end scaler circuit 850 is configurable to allow a user to select whether to use legacy dot fix (using dot fix circuit 814) when a dot is found, or to use the dot fix functionality of the directional LPF circuit 816.

Chromatic Suppression Settings in Bayer and Quadra Image Modes

The chrominance component (CC) of the converted image data generated by the RGB-to-YCC conversion circuit 802 is processed by the chrominance processing circuit 806, which includes a chrominance suppression circuit 824 and a chrominance suppression control circuit 826. The chrominance suppression circuit 824 is configured to perform chromatic suppression on the received chrominance component data, in accordance with one or more control parameters determined by the chrominance suppression control circuit 826 (e.g., weights values to desaturate the color of the image, corresponding to an alpha blend between a gray/desaturated image and the original image). In some embodiments, chrominance suppression control circuit 826 determines the one or more control parameters based on the luminance and chrominance components of the received image data. For example, as discussed above, the output of the luminance pre-processing circuit 804, corresponding to a processed luminance component $Y_{out}$ of the received image data, may be used to control a level of chromatic suppression to be performed on the chrominance component of the received image data (e.g., by the chrominance processing circuit 824). In some embodiments, as illustrated in FIG. 8A, the processed luminance component data $Y_{out}$ is passed through a linear filter circuit 820 (e.g., a 5×5 linear filter) to generate an input for the chroma suppression control circuit 826. As discussed above, in some embodiments, the output of the linear filter circuit 820 may include a maximum luminance value $Y_{max}$ and/or a high frequency luminance $Y_{HF}$.

In some embodiments, the chrominance component of the received image data is divided into alternating lines of chromatic image data (e.g., CC (even) and CC (odd), corresponding to even and odd lines). In Bayer image mode, the even lines are stored in the chrominance line buffers 810 and passed through a linear filter circuit 828 (e.g., a 7×7 linear filter circuit) to generate filtered background chrominance values ($CC_{bg}$), while odd lines are delayed using a delay circuit 830 to match the delay of the filtered background. In some embodiments, the delayed odd line chrominance data is recombined with even line chrominance data and used by the chroma suppression control circuit 826 to determine an amount of chromatic suppression to be performed.

In some embodiments, the filtered background chrominance $CC_{bg}$ output by the linear filter circuit 828 includes only even lines of chrominance data. In some embodiments, the scaler circuit includes an interpolation circuit 834 that interpolates values for the odd lines of chrominance data based on the filtered even lines output by linear filter circuit 828. For example, in some embodiments, the interpolated chromatic value for each odd line may correspond to a duplicated chromatic value of an adjacent even line, or an aggregation of the chromatic values of two or more nearby even lines (e.g., an average of chromatic values corresponding to neighboring even lines directly above and below a given odd line). The filtered even lines and the interpolated odd lines of chrominance data may be combined to form an overall background chrominance $CC_{bg}$ received by chrominance suppression circuit 824, which performs chrominance suppression by blending (e.g., alpha blending) the overall background chrominance $CC_{bg}$ and the original chrominance data of the demosaiced image (e.g., CC (even) and CC (odd)), in accordance with one or more parameters received from the chroma suppression control circuit 826 (e.g., weight values). The output of the chrominance suppression circuit 824 corresponds to a processed chrominance component $CC_{out}$, which, along with the processed luminance component $Y_{out}$, may be received by a YCC-to-RGB conversion circuit 832 to be converted into processed RGB image data.

Although the above discussion describes using the linear filter 828 to operate on even lines of chrominance data, and interpolating odd lines using the interpolation circuit 834, it is understood that in other embodiments, the linear filter 828 may operate on odd lines, while the interpolation circuit 834 interpolates even lines. In some embodiments, the linear filter 828 may be configured to operate on both even and odd lines of chrominance data of the demosaiced image to output filtered background chrominance $CC_{bg}$, eliminating a need for the interpolation circuit 834. In other embodiments, subsets of chrominance data other than even or odd lines may be used.

As discussed above, the multi-mode demosaicing circuit 404 may need a greater amount of memory for demosaicing Quadra image data in comparison to Bayer image data. As such, in embodiments in which the multi-mode demosaicing circuit 404 and the front-end scaler circuit 406 access a common shared memory 602 for use as working memory when performing image processing operations (e.g., as illustrated in FIG. 6), the multi-mode demosaicing circuit 404 utilizes a larger portion of the shared memory 602 when demosaicing Quadra image data in comparison to Bayer image data. In such embodiments, to compensate for the additional memory needed by the multi-mode demosaicing circuit 404, the scaler circuit 406 is configured to perform operations that consume less memory when in Quadra image mode in comparison to Bayer image mode.

As discussed above, in some embodiments, the chrominance component of the received image data is divided into different subsets, e.g., alternating lines of chromatic image data, such as even and odd lines. When the scaler circuit is operating in Bayer image mode (e.g., as illustrated in FIG. 8A), both even and odd lines (e.g., corresponding to 4:4 chrominance data) may be used by the chroma suppression control circuit 826 to determine an amount of chromatic suppression to be performed. However, when the scaler circuit is operating in Quadra image mode (e.g., as illustrated in FIG. 8B), the scaler circuit may discard certain lines of image data (e.g., odd lines), and use only a remaining portion of the image data (e.g., even lines of image data, corresponding to 2:2 chrominance image data) as input to the chroma suppression control circuit 826 to determine an amount of chromatic suppression to be performed (e.g., weight values). In addition, in some embodiments, the chromatic suppression circuit 824 may, in Quadra image mode, perform chromatic suppression based upon only the remaining portion of image data, e.g., alpha-blending the even line chrominance of the demosaiced image (CC (even)) with the filtered even lines output by the linear filter 828 ($CC_{bg}$), based upon weight values determined by the chroma suppression control circuit 826. This may allow the scaler circuit to perform chromatic suppression on the received image data using a smaller amount of working memory, thus reducing a portion of the shared memory 602 utilized by the scaler circuit when operating in Quadra image mode.

In some embodiments, the scaler circuit includes an interpolation circuit 836 used in Quadra image mode to interpolate chromatic values for discarded lines of chrominance data (e.g., odd lines). The interpolation circuit 836 interpolates chromatic values for discarded odd lines of image data, based upon chromatic values one or more nearby even lines of image data (e.g., duplicated from an adjacent even line, or an aggregation of two or more nearby even lines). In some embodiments, such as that illustrated in FIG. 8B, the chromatic suppression circuit 824 is configured to receive and perform chromatic suppression on only a portion of the image data (e.g., even lines only), and the interpolation circuit 836 is coupled to an output of the chromatic suppression circuit 826, and interpolates values corresponding to previously discarded lines of image data (e.g., odd lines) based upon the processed even lines, so that a full set of chromatic image data (e.g., comprising even and odd lines) is output. In some embodiments, this may reduce the number of lines of image data that the chromatic suppression circuit 824 operates on. In some embodiments, the interpolation circuit 836 is the circuit as the interpolation circuit 834 used in Bayer image mode illustrated in FIG. 8A, where the input and output of the interpolation circuit are changed based upon which mode the scaler circuit is operating in.

Scaling Mode

Figure 10:
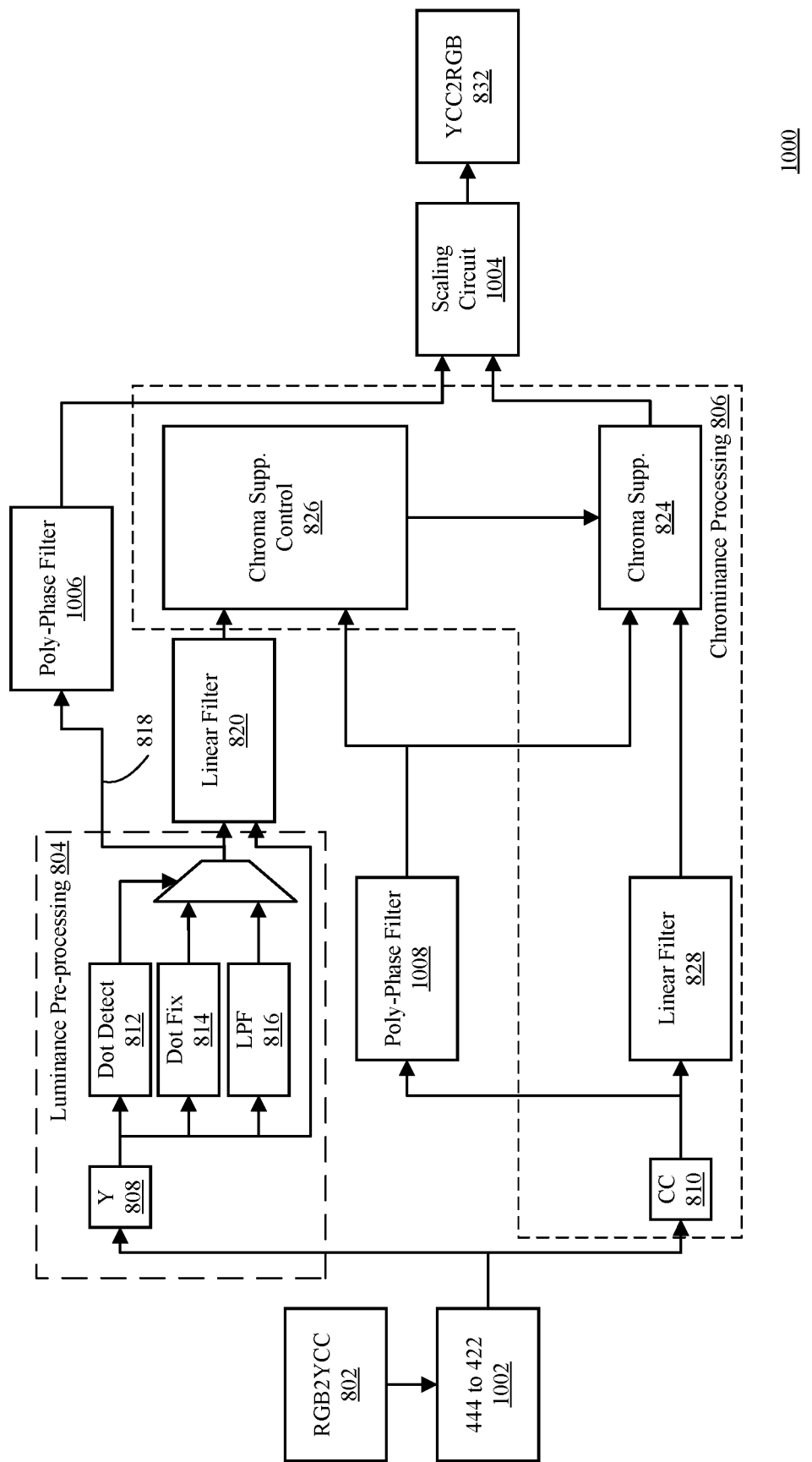
FIG. 10 illustrates a block diagram of a front-end scaler circuit configured to perform post-processing on received image data in scaling mode, in accordance with some embodiments.

FIG. 10 illustrates a block diagram of a front-end scaler circuit configured to perform post-processing on received image data in scaling mode, in accordance with some embodiments. As discussed above, in some embodiments, scaling mode may be referred to as 4:2:2 mode (in contrast with non-scaling mode being referred to as 4:4:4 mode), due to the scaling circuit, when scaling image data, converting received YCC image data from 4:4:4 format to 4:2:2 format by smoothing and downsampling the chrominance, and scaling the image to a desired scale via vertical and horizontal resampling. For example, as illustrated in FIG. 10, the scaler circuit 1000 includes a 444-to-422 conversion circuit 1002 configured to receive YCC image data output by the RGB-to-YCC conversion circuit 802, and downsampling the chrominance values of the received image data to generate 4:2:2 YCC image data. In some embodiments, conversion of the YCC image data from 4:4:4 format to 4:2:2 format is performed to save line buffer space, reducing an amount of the shared memory 602 needed by the scaler circuit for processing and scaling demosaiced image data. In some embodiments, due to scaling image data utilizing line buffer space (based on a level of scaling), a level at which image data generated from Quad Bayer raw image data may be scaled may be limited, in order to limit an amount of line buffers utilized by the scaler circuit for scaling (e.g., to allow for the demosaicing circuit to utilize additional line buffers from demosaicing Quad Bayer raw image data, in comparison to Bayer raw image data).

In addition, the scaler circuit 1000 includes a scaling circuit 1004 configured to receive processed luminance and chrominance image data (e.g., $Y_{out}$ and $CC_{out}$) that together form the processed YCC image data, and scale the processed image data to a desired level when the scaler circuit 1000 is operating in scaling mode. In some embodiments, the scaling circuit 1004 performs vertical and/or horizontal resampling to scale the image to the desired scale, and outputs the scaled YCC image data to the YCC-to-RGB conversion circuit 832 to generate full-color RGB output image data. While FIG. 10 illustrates that the scaling circuit 1004 is configured to receive and scale processed YCC image data, in other embodiments, the scaling circuit 1004 may be configured to receive an output of the YCC-to-RGB conversion circuit 832, and scales the received RGB image data.

In some embodiments, the scaling circuit 1004 is a horizontal scaling circuit that scales received image data in a horizontal direction. In some embodiments, the scaler circuit 1000 further comprises a poly-phase filter 1006 configured to receive the processed output luminance 818, and a poly-phase filter 1008 configured to receive the chrominance component of the 4:2:2 image data (e.g., from chrominance line buffers 810). Each poly-phase filter may correspond to a scaling filter bank that scales received image data along a vertical direction, based upon a specified level of scaling. In some embodiments, the scaling circuit 1004 scaling the combined output luminance and chrominance data along a horizontal direction, combined with the earlier vertical scaling by poly-phase filters 1006/1008, yields image data scaled to a specified level in both vertical and horizontal directions. In some embodiments, the scaling circuit 1004, when performing scaling, also interpolates the chrominance image data to convert the 4:2:2 image data to 4:4:4 image data.

Example Process Flows

Figure 11:
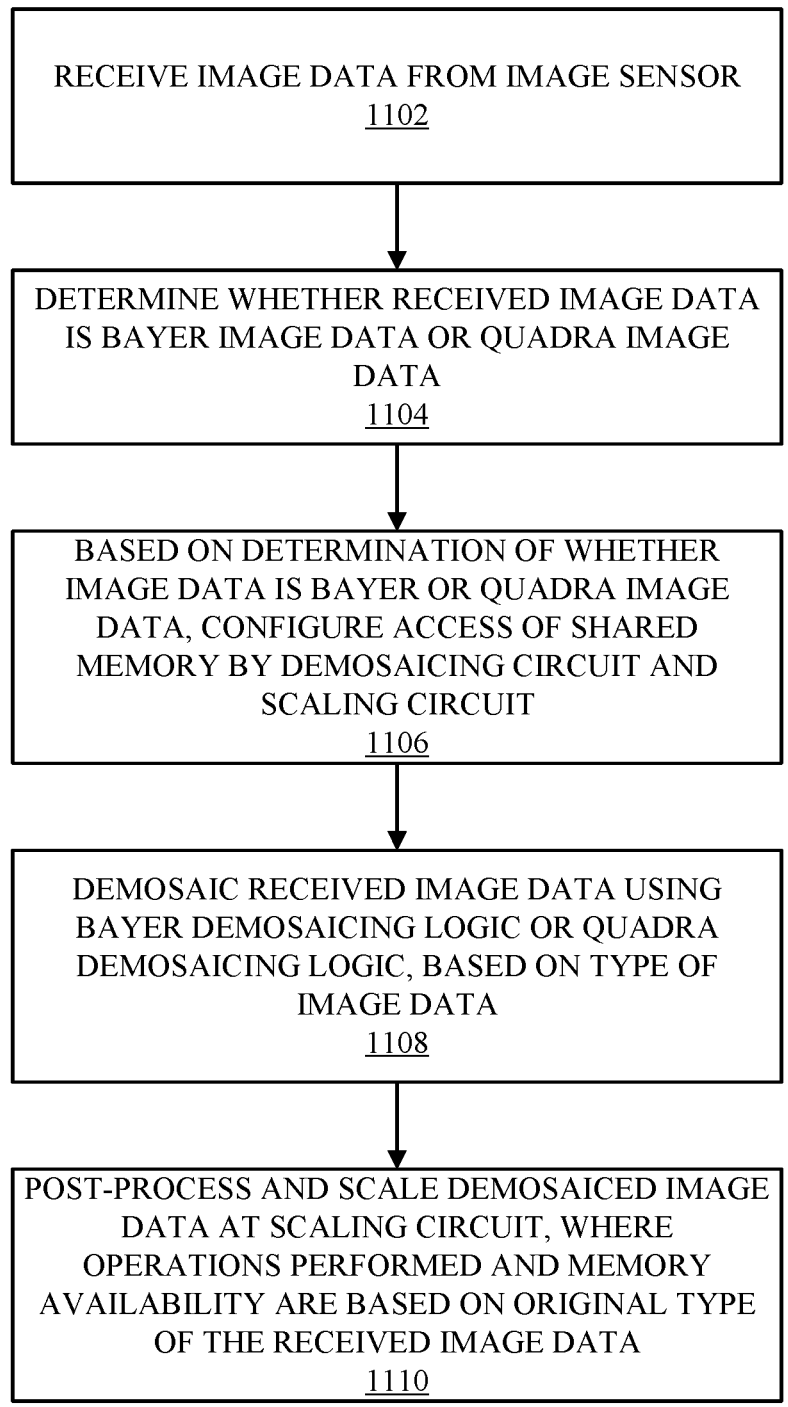
FIG. 11 is a flowchart of a process for multi-mode demosaicing and scaling of image data, in accordance with some embodiments.

FIG. 11 is a flowchart of a process for multi-mode demosaicing and scaling of image data, in accordance with some embodiments. The process described by FIG. 11 may be performed by a demosaic processing circuit, such as demosaic processing circuit 402 illustrated in FIG. 4, that contains a demosaicing circuit and a scaling circuit.

The demosaic processing circuit receives 1102 image data from one or more image sensors. In some embodiments, the demosaic processing circuit may be configured to receive image data from a single image sensors configurable to capture image data in different formats (e.g., Bayer image data when zoomed out above a certain level, or Quadra image data when zoomed in above a certain level), or from multiple different image sensors. In some embodiments, the demosaic processing circuit receives the image data from the one or more image sensors directly, while in other embodiments, the demosaic processing circuit receives the image data following one or more raw processing stage operations (e.g., black level compensation, highlight recovery and defective pixel correction).

The demosaic processing circuit determines 1104 a format of the received image data. For example, the demosaic processing circuit may determine whether the received image data is in a raw Bayer image format or a raw Quadra image format.

The demosaic processing circuit, based on the determination of the image format of the received image data (e.g., Bayer image format or Quadra image format), configures 1106 access to a shared memory by the demosaicing circuit and the scaling circuit. In some embodiments, the shared memory contains a plurality of line buffers, where, based upon whether the received image data is Bayer or Quadra image data, a number of line buffers within the shared memory accessible to each of the demosaicing circuit and the scaling circuit is different. For example, in some embodiments, demosaicing of Quadra data may utilize larger filter kernels in comparison to demosaicing Bayer image data. As such, the demosaicing circuit may access a larger number of line buffers in the shared memory when the received image data is Quadra image data, for use in demosaicing Quadra image data. In addition, a number of line buffers utilized by the scaling circuit may be reduced to compensate for the additional line buffers accessed by the demosaicing circuit.

The demosaic processing circuit demosaics 1108 the received image data using Bayer demosaicing logic or Quadra demosaicing logic, based on type of image data. For example, in some embodiments, the demosaicing circuit includes a Bayer demosaicing circuit and a Quadra demosaicing circuit, configured to receive image data in a raw Bayer format and in a raw Quadra format, respectively, and to demosaic the image data to output full-color image data (e.g., RGB image data). In some embodiments, the Bayer demosaicing circuit and Quadra demosaicing circuit use different filters and interpolation kernels for demosaicing image data, but may share logic for performing certain operations, e.g., arithmetic operations.

The demosaic processing circuit post-processes and scales 1110 the demosaiced image data at scaling circuit, where operations performed and memory availability are based on original type of the received image data. For example, in some embodiments, the scaling circuit may perform different post-processing operations on received image data that was originally demosaiced from Quadra image data compared to Bayer image data, in order to remove artifacts that may be introduced into the image by the Quadra demosaicing process that may not be present in image data demosaiced from Bayer image data. In addition, the scaling circuit may be configured to, for post-processing and/or scaling operations on image data demosaiced from Quadra image data, perform different operations that utilize fewer line buffers in comparison to if the image data was demosaiced from Bayer image data, in order to compensate for additional line buffers used by the demosaicing circuit when demosaicing Quadra image data, such as performing chrominance suppression on only a portion of the chrominance data of the demosaiced image (e.g., even lines only) instead of on the entire image (e.g., both odd and even lines). As such, the demosaic processing circuit may be configured to perform demosaicing and scaling of either Bayer image data or Quadra image data, without increasing an amount of memory needed relative to previous circuits which only performed demosaicing and scaling on Bayer image data.

Figure 12:
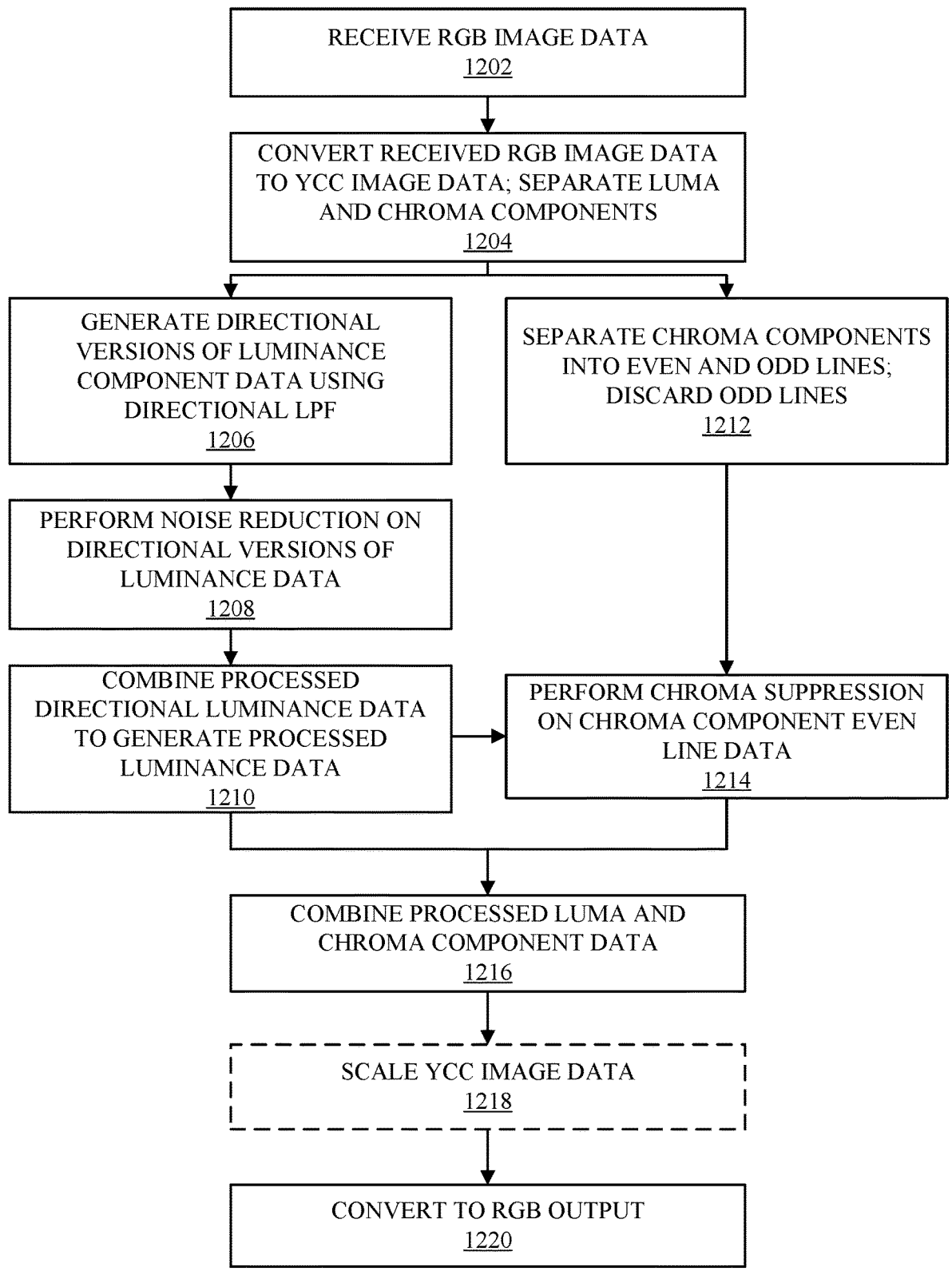
FIG. 12 is a flowchart of a process for processing demosaicing Quadra image data, in accordance with some embodiments.

FIG. 12 is a flowchart of a process for processing demosaiced Quadra image data, in accordance with some embodiments. The process of FIG. 12 may be performed by a front-end scaler circuit, such as the scaler circuit 606 illustrated in FIG. 6 operating in Quadra image mode (e.g., utilizing Quadra scaling circuit 622).

The scaler circuit receives 1202 demosaiced image data (e.g., RGB image data) from a demosaicing circuit. In some embodiments, the RGB image data is received from a multi-mode demosaicing circuit configurable to demosaic raw image data received as either Bayer image data or Quadra image data. In some embodiments, the scaler circuit also receives information indicating that the received image data was demosaiced from Quadra raw image data. The scaler circuit converts 1204 the received image data into image data having luminance (Y) and chrominance (CC) data (e.g., YCC image format), and separates the luminance and chrominance components of the image data to undergo luminance pre-processing and chromatic suppression, respectively.

The scaler circuit performs luminance pre-processing on the luminance component of the image data by generating 1206 a plurality of directional versions of the luminance component data using one or more directional low-pass filter circuits. In some embodiments, the plurality of directions may include horizontal, vertical, upwards diagonal, and downwards diagonal directions. The scaler circuit performs 1208 noise reduction on each directional version of the luminance data. In some embodiments, the scaler circuit determines gradient values corresponding to the direction of each of the directional versions of the luminance data, and performs noise reduction based on the calculated gradient values. In some embodiments, the scaler circuit may also perform dot fix operations on each of the directional versions of the luminance data. The scaler circuit combines 1210 the processed directional luminance data corresponding to each of the plurality of directions to generate an overall processed luminance data signal ($Y_{out}$). In some embodiments, the scaler circuit combines the processed directions versions of the luminance data using as a weighted average, based upon the gradient values of each of the directional versions of the luminance data.

To perform chromatic suppression on the chrominance values of the image data, the scaler circuit separates 1212 the chroma components into alternating lines of chroma component values (e.g., even and odd lines), and discards a portion of the lines (e.g., the odd lines). This may be done in order to reduce an amount of working memory needed by the scaler circuit to process the received image data (e.g., to compensate for increased memory needed by the demosaicing circuit when demosaicing Quad Bayer image data in comparison to Bayer image data, when the scaler circuit and demosaicing circuit share a common shared memory).

The scaler circuit performs 1214 chromatic suppression of the remaining chrominance component data (e.g., even lines of chrominance data). In some embodiments, the scaler circuit performs chromatic suppression in accordance with one or more control parameters determined based upon the processed luminance data (from 1210) and the even line chrominance data. For example, the processed luminance data and even line chrominance data may be used to determine one or more weight values used to alpha-blend the even line chrominance data with filtered background chrominance values generated from the even line chrominance data, to generate suppressed even line chrominance data. In some embodiments, the suppressed even line chrominance data is interpolated to reconstruct chrominance data for the discarded odd lines, to yield a full set of suppressed chrominance data that includes both odd and even lines.

The scaler circuit combines 1216 the processed luminance data (from 1210) and the suppressed chrominance data (from 1214) to generate processed image data (e.g., processed YCC image data). In some embodiments, the scaler circuit scales 1218 the combined processed YCC image data. For example, the scaler circuit may perform horizontal and vertical resampling to scale the YCC image data to a desired level. In some embodiments where the scaler circuit may operating in a non-scaling mode, the scaler circuit does not scale the processed YCC image data. The scaler circuit converts 1220 the processed YCC image data into RGB image data, and outputs the RGB image data for use in further processing (e.g., for pyramid generation, or other image processing functions).

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing demosaiced image data, comprising:
   an image space conversion circuit configured to convert input image data derived from raw image data into converted image data comprising luminance data and chrominance data;
   a luminance pre-processing circuit coupled to the image space conversion circuit and configured to:
      generate a first version of the luminance data associated with a first direction;
      generate a second version of the luminance data associated with a second direction that is different than the first direction;
      perform one or more first noise reduction operations on the first version of the luminance data to generate first noise-reduced luminance data;
      perform one or more second noise reduction operations on the second version of the luminance data to generate second noise-reduced luminance data; and
      combine the first noise-reduced luminance data and the second noise-reduced luminance data to generate processed luminance data;
   a chroma processing circuit coupled to the image space conversion circuit and configured to perform one or more chrominance suppression functions on at least a portion of the chrominance data to generate processed chrominance data; and
   a second image space conversion circuit configured to receive the processed luminance data and processed chrominance data, and convert the processed luminance data and processed chrominance data into processed image data.

2. The apparatus of claim 1, wherein the luminance pre-processing circuit generates the first version of the luminance data by passing the luminance data through a first directional low-pass filter corresponding to the first direction, and
   wherein the luminance pre-processing circuit generates the second version of the luminance data by passing the luminance data through a second directional low-pass filter corresponding to the second direction.

3. The apparatus of claim 1, wherein the chroma processing circuit is configured to, in a first mode:
   discard at least a portion of the chrominance data, and
   perform the one or more chrominance suppression functions on a remaining portion of the chrominance data to generate the processed chrominance data.

4. The apparatus of claim 3, wherein the chrominance data is arranged in a plurality of lines, and wherein the chroma processing circuit is configured to:
   discard odd lines of the plurality of lines, and
   perform the one or more chrominance suppression functions using the remaining portion of the chrominance data corresponding to even lines of the plurality of lines.

5. The apparatus of claim 3, wherein the luminance pre-processing circuit and chroma processing circuit access a memory shared with a demosaicing circuit configured to derive the input image data from raw image data, and wherein the chroma processing circuit is configured to store the remaining portion of the chrominance data in the shared memory.

6. The apparatus of claim 5, wherein the chroma processing circuit is configured to, in a second mode, perform the one or more chrominance suppression functions on the chrominance data without discarding the at least a portion of the chrominance data, such that the chroma processing circuit is configured to utilize a larger portion of the shared memory when the demosaicing circuit is operating in the second mode in comparison to the first mode.

7. The apparatus of claim 6, wherein the chroma processing circuit operates in the first mode responsive to a determination that the demosaicing circuit derived the input image data from Quad Bayer raw image data, and operates in the second mode responsive to a determination that the demosaicing circuit derived the input image data from Bayer raw image data.

8. The apparatus of claim 3, wherein the chrominance data is arranged in a plurality of lines, and wherein the chroma processing circuit is further configured to:
   using the remaining portion of the chrominance data, generate a plurality of interpolated lines of the chrominance data corresponding to the discarded portion of the chrominance data; and
   perform the one or more chrominance suppression functions using the remaining portion of the chrominance data and the plurality of interpolated lines to generate the processed chrominance data.

9. The apparatus of claim 1, further comprising a scaling circuit configured to receive the processed luminance data and processed chrominance data, and to scale the processed luminance data and processed chrominance data using horizontal and vertical resampling.

10. The apparatus of claim 1, wherein the luminance pre-processing circuit is further configured to perform a dot fixing operation on each of the first version of the luminance data and the second version of the luminance data.

11. The apparatus of claim 1, wherein the luminance pre-processing circuit is further configured to:
    for each of the first version of the luminance data and the second version of the luminance data, generate respective gradient values corresponding to a respective direction associated with each of the first version of the luminance data and the second version of the luminance data; and
    combine the first noise-reduced luminance data and the second noise-reduced luminance data to generate the processed luminance data using a weighted averaging function, where the first noise-reduced luminance data and the second noise-reduced luminance data are weighted based upon the respective gradient values.

12. An electronic device comprising:
    an image sensor; and
    an image signal processor coupled to the image sensor and configured to receive image data from the image sensor, comprising:
       a demosaicing circuit configured to demosaic raw image to generate input image data;

an image space conversion circuit configured to convert the input image data received from the demosaicing circuit into converted image data comprising luminance data and chrominance data;

a luminance pre-processing circuit coupled to the image space conversion circuit and configured to:
generate a first version of the luminance data associated with a first direction;
generate a second version of the luminance data associated with a second direction that is different than the first direction;
perform one or more first noise reduction operations on the first version of the luminance data to generate first noise-reduced luminance data;
perform one or more second noise reduction operations on the second version of the luminance data to generate second noise-reduced luminance data;
combine the first noise-reduced luminance data and the second noise-reduced luminance data plurality to generate processed luminance data;

a chroma processing circuit coupled to the image space conversion circuit and configured to and perform one or more chrominance suppression functions on at least a portion of the chrominance data to generate processed chrominance data; and a second image space conversion circuit configured to receive the processed luminance data and processed chrominance data, and to convert the processed luminance data and processed chrominance data into processed image data.

13. The electronic device of claim 12, wherein the luminance pre-processing circuit generates the first version of the luminance data by passing the luminance data through a first directional low-pass filter corresponding to the first direction, and wherein the luminance pre-processing circuit generates the second version of the luminance data by passing the luminance data through a second directional low-pass filter corresponding to the second direction.

14. The electronic device of claim 12, wherein the chroma processing circuit is configured to, in a first mode:
discard at least a portion of the chrominance data, and
perform the one or more chrominance suppression functions on a remaining portion of the chrominance data to generate the processed chrominance data.

15. The electronic device of claim 14, wherein the chrominance data is arranged in a plurality of lines, and wherein the chroma processing circuit is configured to:
discard odd lines of the plurality of lines, and
perform the one or more chrominance suppression functions using the remaining portion of the chrominance data corresponding to even lines of the plurality of lines.

16. The electronic device of claim 14, wherein the luminance pre-processing circuit and chroma processing circuit access a memory shared with the demosaicing circuit, and wherein the chroma processing circuit is configured to store the remaining portion of the chrominance data in the shared memory.

17. The electronic device of claim 16, wherein the chroma processing circuit is configured to, in a second mode, perform the one or more chrominance suppression functions on the chrominance data without discarding the at least a portion of the chrominance data, such that the chroma processing circuit is configured to utilize a larger portion of the shared memory when the demosaicing circuit is operating in the second mode in comparison to the first mode.

18. The electronic device of claim 17, wherein the chroma processing circuit operates in the first mode responsive to a determination that the demosaicing circuit derived the input image data from Quad Bayer raw image data, and operates in the second mode responsive to a determination that the demosaicing circuit derived the input image data from Bayer raw image data.

19. The electronic device of claim 12, further comprising a scaling circuit configured to receive the processed luminance data and processed chrominance data, and to scale the processed luminance data and processed chrominance data using horizontal and vertical resampling.

20. The electronic device of claim 12, wherein the luminance pre-processing circuit is further configured to:
for each of the first version of the luminance data and the second version of the luminance data, generate respective gradient values corresponding to a respective direction associated with each of the first version of the luminance data and the second version of the luminance data; and
combine the first noise-reduced luminance data and the second noise-reduced luminance data to generate the processed luminance data using a weighted averaging function, where the first noise-reduced luminance data and the second noise-reduced luminance data plurality are weighted based upon the respective gradient values.

* * * * *

UNITED STATES PATENT AND TRADEMARK OFFICE
CERTIFICATE OF CORRECTION

PATENT NO. : 12,260,511 B2
APPLICATION NO. : 17/578195
DATED : March 25, 2025
INVENTOR(S) : Swami et al.

It is certified that error appears in the above-identified patent and that said Letters Patent is hereby corrected as shown below:

On the Title Page

Column 1, Item (72), in "Inventors", Line 2, delete "R" and insert -- R. --, therefor.

In the Claims

In Column 33, Claim 12, Line 17, after "data;" insert -- and --.

In Column 33, Claim 12, Line 19, after "data" delete "plurality".

In Column 34, Claim 20, Line 46, after "data" delete "plurality".

Signed and Sealed this
Twenty-ninth Day of April, 2025

Coke Morgan Stewart
*Acting Director of the United States Patent and Trademark Office*